(12) United States Patent
Wu et al.

(10) Patent No.: US 12,550,025 B2
(45) Date of Patent: Feb. 10, 2026

(54) METHODS, TERMINALS AND BASE STATIONS FOR BEAM FOOTPRINT HANDOVER

(71) Applicant: Samsung Electronics Co., Ltd., Gyeonggi-do (KR)

(72) Inventors: Min Wu, Beijing (CN); Feifei Sun, Beijing (CN); Qi Xiong, Beijing (CN)

(73) Assignee: Samsung Electronics Co., Ltd (KR)

( * ) Notice: Subject to any disclaimer, the term of this patent is extended or adjusted under 35 U.S.C. 154(b) by 343 days.

(21) Appl. No.: 18/015,573

(22) PCT Filed: Jul. 15, 2021

(86) PCT No.: PCT/KR2021/009126
§ 371 (c)(1),
(2) Date: Jan. 11, 2023

(87) PCT Pub. No.: WO2022/015083
PCT Pub. Date: Jan. 20, 2022

(65) Prior Publication Data
US 2023/0328608 A1    Oct. 12, 2023

(30) Foreign Application Priority Data

Jul. 17, 2020    (CN) .......................... 202010694689.8

(51) Int. Cl.
*H04W 36/08*    (2009.01)
*H04B 7/06*    (2006.01)
(Continued)

(52) U.S. Cl.
CPC ...... *H04W 36/085* (2023.05); *H04B 7/06952* (2023.05); *H04W 16/28* (2013.01); *H04W 36/0058* (2018.08)

(58) Field of Classification Search
CPC .. H04L 5/0053; H04L 5/0048; H04W 36/085; H04W 16/28; H04W 36/0058;
(Continued)

(56) References Cited

U.S. PATENT DOCUMENTS 10,595,241 B2    3/2020    Yue et al.
2006/0084474 A1    4/2006    Iacono et al.
(Continued)

FOREIGN PATENT DOCUMENTS

CN    110999395    4/2020
CN    111343643    6/2020
(Continued)

OTHER PUBLICATIONS

Asia Pacific Telecom ("Discussion on physical layer control procedures for NTN", 3GPP TSG-RAN WG1 Meeting #98, R1-1908934, Aug. 26-30, 2019) (Year: 2019).*

(Continued)

*Primary Examiner* — Ji-Hae Yea
(74) *Attorney, Agent, or Firm* — The Farrell Law Firm, P.C.

(57) ABSTRACT

The disclosure provides a method for beam footprint handover, a method for receiving information, a method for transmitting information, a terminal and a base station. The method for beam footprint handover performed by a terminal comprises the following steps: receiving a first signaling, wherein the first signaling is used for instructing the terminal to hand over from a first beam footprint to a second beam footprint; handing over from the first beam footprint to the second beam footprint in response to the first signaling; wherein a beam footprint is a coverage range of the downlink beamforming signals, the first beam footprint and the second beam footprint belong to a same cell, and downlink signals in the first beam footprint are transmitted with the
(Continued)

first beam, while downlink signals in the second beam footprint are transmitted with the second beam.

14 Claims, 27 Drawing Sheets

(51) Int. Cl.
*H04W 16/28* (2009.01)
*H04W 36/00* (2009.01)

(58) Field of Classification Search
CPC ......... H04W 36/0005; H04W 36/0085; H04W 36/06; H04B 7/0617; H04B 7/0695; H04B 7/088; H04B 7/06952; H04B 7/06954; H04B 7/06956; H04B 7/06958; H04B 7/0696; H04B 7/06962; H04B 7/06964; H04B 7/06966; H04B 7/06968
See application file for complete search history.

(56) References Cited

U.S. PATENT DOCUMENTS

| | | | |
|---|---|---|---|
| 2019/0150013 A1* | 5/2019 | Zhang | H04B 7/082 375/224 |
| 2019/0357193 A1* | 11/2019 | Bai | H04W 72/046 |
| 2020/0044723 A1* | 2/2020 | Cirik | H04L 5/001 |
| 2020/0205145 A1 | 6/2020 | John Wilson et al. | |
| 2021/0076445 A1* | 3/2021 | Tsai | H04W 76/19 |
| 2022/0086671 A1* | 3/2022 | Hong | H04W 16/28 |

FOREIGN PATENT DOCUMENTS

| | | |
|---|---|---|
| EP | 3678406 | 7/2020 |
| WO | WO 2019/028728 | 2/2019 |
| WO | WO 2020/145559 | 7/2020 |

OTHER PUBLICATIONS

CATT ("Physical layer control procedure enhancement", 3GPP TSG RAN WG1 Meeting #99, R1-1912164, Nov. 18-22, 2019) (Year: 2019).*
MediaTek Inc. ("Physical layer control procedure for NTN", 3GPP TSG RAN WG1 Meeting #99, R1-1912123, Nov. 18-22, 2019) (Year: 2019).*
Asia Pacific Telecom, "Discussion on Physical Layer Control Procedures for NTN", R1-1908934, 3GPP TSG-RAN WG1 Meeting #98, Aug. 26-30, 2019, 6 pages.
CATT, "Physical Layer Control Procedure Enhancement", R1-1912164, 3GPP TSG RAN WG1 Meeting #99, Nov. 18-22, 2019, 4 pages.
MediaTek Inc., "Physical Layer Control Procedure in NR-NTN", R1-1912123, 3GPP TSG RAN WG1 Meeting #99, Nov. 18-22, 2019, 5 pages.
European Search Report dated Oct. 27, 2023 issued in counterpart application No. 21842229.3-1216, 11 pages.
PCT/ISA/210, International Search Report dated Oct. 22, 2021 issued in counterpart application No. PCT/KR2021/009126, 3 pages.
PCT/ISA/237, Written Opinion dated Oct. 22, 2021 issued in counterpart application No. PCT/KR2021/009126, 5 pages.
EP Intention to Grant dated Oct. 28, 2025 issued in counterpart application No. 21842229.3-1206, 154 pages.

* cited by examiner

SWITCH FROM THE FIRST FREQUENCY BAND TO THE CELL COMMON FREQUENCY BAND, MEASURE THE REFERENCE SIGNALS TRANSMITTED WITH THE FIRST BEAMFORMING TO OBTAIN THE MEASUREMENT RESULT CORRESPONDING TO THE FIRST BEAM FOOTPRINT, AND MEASURE THE REFERENCE SIGNALS TRANSMITTED WITH THE SECOND BEAMFORMING TO OBTAIN THE MEASUREMENT RESULT CORRESPONDING TO THE SECOND BEAM FOOTPRINT ON THE CELL COMMON FREQUENCY BAND ~ S710

FIG. 14

AUTONOMOUSLY TRIGGER THE REFERENCE SIGNAL MEASUREMENT BASED ON THE PREDETERMINED OR PRECONFIGURED INFORMATION — S1210

FIG. 20

TRANSMIT TO THE BASE STATION A SIXTH SIGNALING, WHICH IS USED TO ACKNOWLEDGE THAT THE FIRST SIGNALING TRANSMITTED BY THE BASE STATION WAS SUCCESSFULLY RECEIVED ~S1410

FIG. 22

RETURN TO THE FIRST BAND TO MONITOR THE PHYSICAL DOWNLINK CONTROL CHANNEL (PDCCH) SCRAMBLED BY THE CELL RADIO NETWORK TEMPORARY IDENTIFIER (C-RNTI) OR PRECONFIGURED SCHEDULING RADIO NETWORK TEMPORARY IDENTIFIER (CS-RNTI), IF THE PDCCH SCRAMBLED BY THE C-RNTI OR THE CS-RNTI IS NOT MONITORED ON THE SECOND BAND WITHIN A PRESET TIME AFTER THE BEAM FOOTPRINT HANDOVER IS PERFORMED ― S1510

FIG. 23

METHODS, TERMINALS AND BASE STATIONS FOR BEAM FOOTPRINT HANDOVER

PRIORITY

This application is a National Phase Entry of PCT International Application No. PCT/KR2021/009126, which was filed on Jul. 15, 2021, and claims priority to Chinese Patent Application No. 202010694689.8, which was filed on Jul. 17, 2020, the entire content of which is incorporated herein by reference.

TECHNICAL FIELD

The present disclosure relates to the technical field of wireless communication, in particular to methods, terminals and base stations for beam footprint handover.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services may be provided according to the development of a wireless communication system, and thus a method for easily providing such services is required.

DISCLOSURE OF INVENTION

Solution to Problem

The present disclosure provides a method for beam footprint handover, a method for receiving information, a method for transmitting information, a terminal and a base station. The method for beam footprint handover performed by a terminal comprises the following steps: receiving a first signaling, wherein the first signaling is used for instructing the terminal to hand over from a first beam footprint to a second beam footprint; handing over from the first beam footprint to the second beam footprint in response to the first signaling; wherein a beam footprint is a coverage range of the downlink beamforming signals, the first beam footprint and the second beam footprint belong to a same cell, and downlink signals in the first beam footprint are transmitted with the first beam, while downlink signals in the second beam footprint are transmitted with the second beam.

BRIEF DESCRIPTION OF DRAWINGS

FIG. 14 illustrates a part of a schematic diagram of step 520 in the method for beam footprint handover performed by a terminal according to an embodiment of the present disclosure;

FIG. 20 illustrates a part of a schematic diagram of a method for beam footprint handover performed by a terminal according to an embodiment of the present disclosure;

FIG. 22 illustrates a part of a schematic diagram of a method for beam footprint handover performed by a terminal according to an embodiment of the present disclosure;

FIG. 23 illustrates a part of a schematic diagram of a method for beam footprint handover performed by a terminal according to an embodiment of the present disclosure;

BEST MODE FOR CARRYING OUT THE INVENTION

Figure 1:
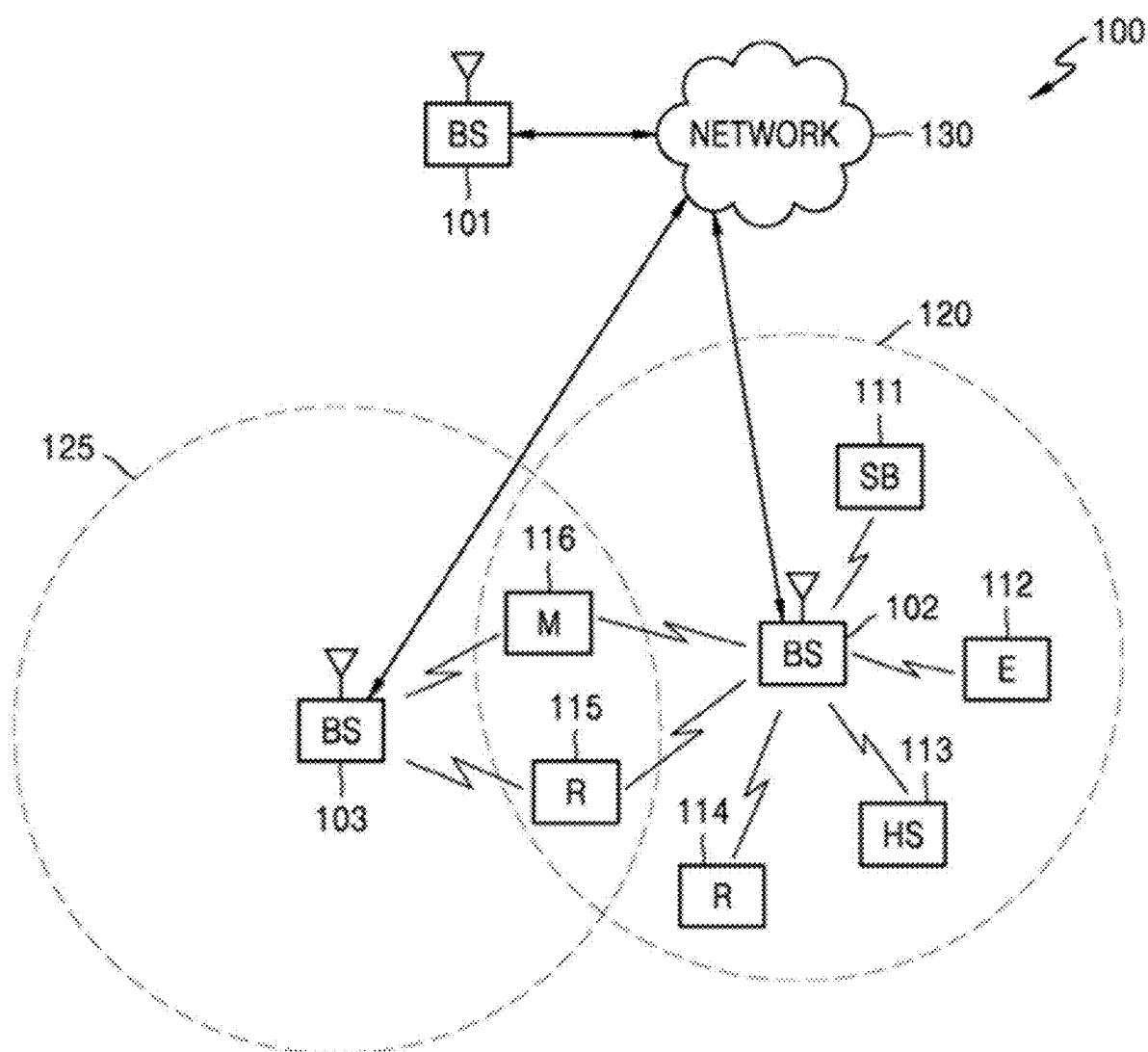
FIG. 1 illustrates an example wireless network according to various embodiments of the present disclosure.

There is a need for a method for beam footprint handover, a method for receiving information, a method for transmitting information, a terminal and a base station.

According to an aspect of the present disclosure, there is provided a method for beam footprint handover performed by a terminal, comprising: receiving a first signaling, which is used to instruct the terminal to hand over from a first beam footprint to a second beam footprint; handing over from the first beam footprint to the second beam footprint in response to the first signaling; wherein the first beam footprint and the second beam footprint belong to the same cell.

According to an aspect of the present disclosure, there is provided a method for receiving information performed by a terminal, comprising: receiving broadcast channels/signals and/or reference signals for beam footprint handover measurement according to at least one of the following ways, based on frequency band information associated with beam footprints and/or cell common frequency band information: receiving the broadcast channels/signals and/or the reference signals for the beam footprint handover measurement transmitted with corresponding beamforming on the frequency band associated with a serving beam footprint; switching from a frequency band associated with the serving beam footprint to a frequency band associated with an adjacent beam footprint to receive the reference signals for the beam footprint handover measurement transmitted with the corresponding beamforming; or switching from the frequency band associated with the serving beam footprint to the cell common frequency band to receive the broadcast channels/signals and/or the reference signals for the beam footprint handover measurement, wherein the broadcast channels/signals and/or the reference signals for the beam footprint handover measurement are transmitted in turn with beam sweeping on the cell common frequency band; wherein the serving beam footprint is a coverage range of beamforming signals currently serving the terminal, and the adjacent beam footprint is a beam footprint geographically adjacent to the serving beam footprint.

According to an aspect of the present disclosure, there is provided a method for beam footprint handover performed by a base station, comprising: transmitting a first signaling to a terminal, wherein the first signaling is used for instructing the terminal to hand over from a first beam footprint to a second beam footprint; wherein the first beam footprint and the second beam footprint belong to a same cell.

According to an aspect of the present disclosure, there is provided a method for transmitting information performed by a base station, comprising: transmitting broadcast channels/signals and/or reference signals for beam footprint handover measurement with respective corresponding beamforming on a frequency band associated with each beam footprint in a cell; and/or transmitting the broadcast channels/signals and/or the reference signals for the beam footprint handover measurement in turn with beam sweeping on a cell common frequency band.

According to another aspect of the present disclosure, there is provided a terminal, the terminal comprising: a transceiver configured to transmit and receive signals with the outside; and a processor configured to control the transceiver to perform a method according to any one of the above methods performed by the terminal.

According to another aspect of the present disclosure, there is provided a base station comprising a transceiver configured to transmit and receive signals with the outside; and a processor configured to control the transceiver to perform a method according to any one of the methods performed by the above base station.

According to another aspect of the present disclosure, there is provided a non-transitory computer-readable recording medium having stored thereon a program, which when executed by a computer, performs any one of the methods described above.

The present disclosure provides a method for beam footprint handover performed by a terminal, wherein the first beam footprint and the second beam footprint belong to a same cell, so that the beam footprint handover can be regarded as mobility management within the cell, and in this way, signaling overhead can be reduced and time delay of the beam footprint handover can be reduced.

MODE FOR THE INVENTION

In order to meet the increasing demand for wireless data communication services since the deployment of 4G communication systems, efforts have been made to develop improved 5G or pre-5G communication systems. Therefore, 5G or pre-5G communication systems are also called "super 4G networks" or "post-LTE systems".

The 5G communication system is implemented in a higher frequency (millimeter, mmWave) frequency band, for example, a 60 GHz frequency band, in order to achieve a higher data rate. In order to reduce propagation loss of radio waves and increase transmission distance, beamforming, large-scale multiple-input multiple-output (MIMO), full-dimensional MIMO (FD-MIMO), array antenna, analog beamforming and large-scale antenna technologies are discussed in 5G communication system.

In addition, in 5G communication system, based on advanced small cell, cloud radio access network (RAN), ultra-dense network, device-to-device (D2D) communication, wireless backhaul, moving network, cooperative communication, cooperative multipoint (CoMP), receiving end interference cancellation, etc., the development of system network improvement is underway.

In 5G systems, hybrid FSK and QAM modulation (FQAM) and sliding window superlocation coding (SWSC) as advanced coding modulation (ACM) and filter bank multicarrier (FBMC), non-orthogonal multiple access (NOMA) and sparse code multiple access (SCMA) as advanced access technologies have been developed.

Embodiments of the present disclosure can be applied to Non-terrestrial networks (NTN), including but not limited to, for example, NTNs with 5G NR (New Radio) as radio access technology, NTNs with LTE (Long Term Evolution) as radio access technology, NTNs with LTE eMTC (LTE enhanced MTO, Internet of Things technology evolved based on LTE) as radio access technology, and NTNs with LTE NB-IOT (Narrow Band Internet of Things) as radio access technology, etc. With the wide-area coverage capability of satellites, NTN can enable operators to provide 5G commercial services in areas with poor ground network infrastructure and realize 5G service continuity, especially in emergency communication, maritime communication, aviation communication and communication along railways.

In addition, the embodiments of the present disclosure can also be applied to terrestrial communication networks, including but not limited to, for example, terrestrial communication networks with 5G NR as radio access technology, terrestrial communication networks with LTE as radio access technology, terrestrial communication networks with LTE eMTC as radio access technology, and terrestrial communication networks with LTE NB-IOT as radio access technology, etc.

The following taking FIGS. 1 to 3b as examples to describe a terrestrial communication network to which embodiments of the present disclosure can be applied.

FIG. 1 is an example wireless network 100 according to various embodiments of the present disclosure. The embodiment of the wireless network 100 shown in FIG. 1 is for illustration only. Other embodiments of the wireless network 100 can be used without departing from the scope of this disclosure.

The wireless network 100 includes a gNodeB (gNB) 101, a gNB 102 and a gNB 103. gNB 101 communicates with gNB 102 and gNB 103. gNB 101 also communicates with at least one Internet protocol (IP) network 130, such as the Internet, a proprietary IP network, or other data networks.

Other well-known terms such as "base station" or "access point" can be used instead of "gNodeB" or "gNB" depending on the network type. For convenience, the terms "gNodeB" and "gNB" are used in this patent document to refer to network infrastructure components that provide radio access to remote terminals. And, other well-known terms such as "mobile station", "user station", "remote terminal", "wireless terminal" or "user device" can be used instead of "user equipment" or "UE", depending on the network type. For convenience, the terms "user equipment" and "UE" are used in this patent document to refer to remote wireless devices that wirelessly access gNB, whether the UE is a mobile device (such as a mobile phone or a smart phone) or is normally considered a stationary device (such as a desktop computer or vending machine).

The gNB 102 provides wireless broadband access to the network 130 for a first plurality of user equipments (UEs) within a coverage 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage 125 of the gNB 103. The second plurality of UEs includes the UE 115 and the UE 116. In some embodiments, one or more of the gNBs 101-103 may communicate with each other and with the UEs 111-116 using 5G, long Term Evolution (LTE), LTE-A, WiMAX, or other wireless communication techniques.

Dotted lines show the approximate extents of the coverages 120 and 125, which are shown as approximately circular for the purposes of illustration and explanation only. It should be clearly understood that the coverages associated with gNBs, such as the coverages 120 and 125, may have other shapes, including irregular shapes, depending upon the configuration of the gNBs and variations in the radio environment associated with natural and man-made obstructions.

As will be described in more detail below, one or more of the gNB 101, the gNB 102, and the gNB 103 includes a 2D antenna array as described in embodiments of the present disclosure. In some embodiments, one or more of gNB 101, gNB 102, and gNB 103 support codebook design and structure for systems with 2D antenna arrays.

Although FIG. 1 shows an example of a wireless network 100, various changes can be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2A:
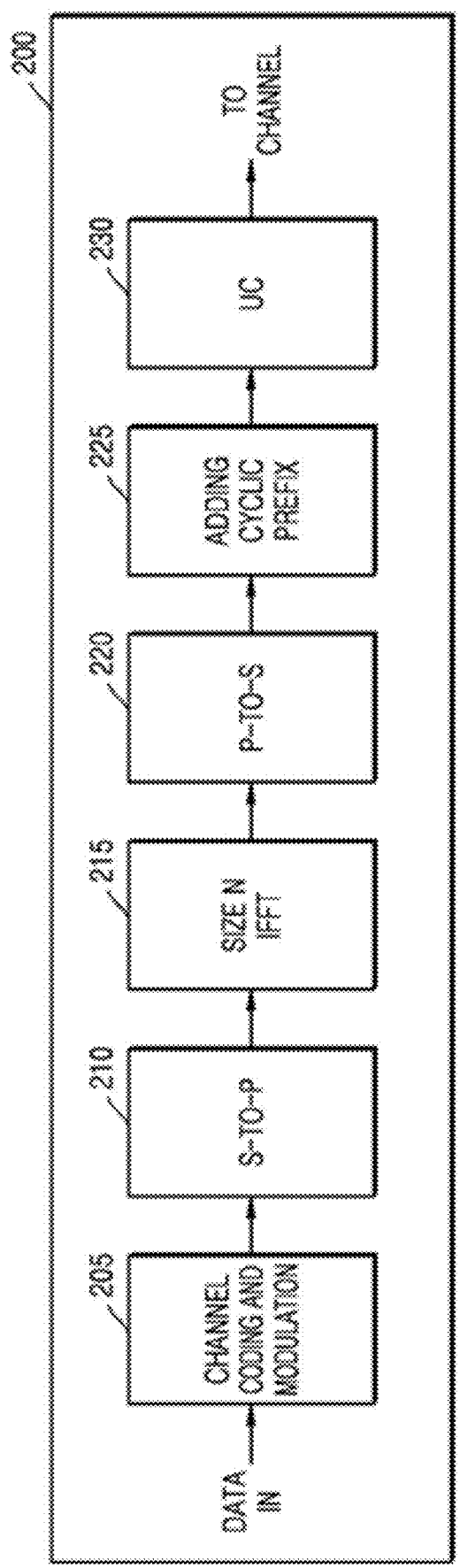
FIG. 2a illustrates example wireless transmission and reception paths according to the present disclosure.
Figure 2B:
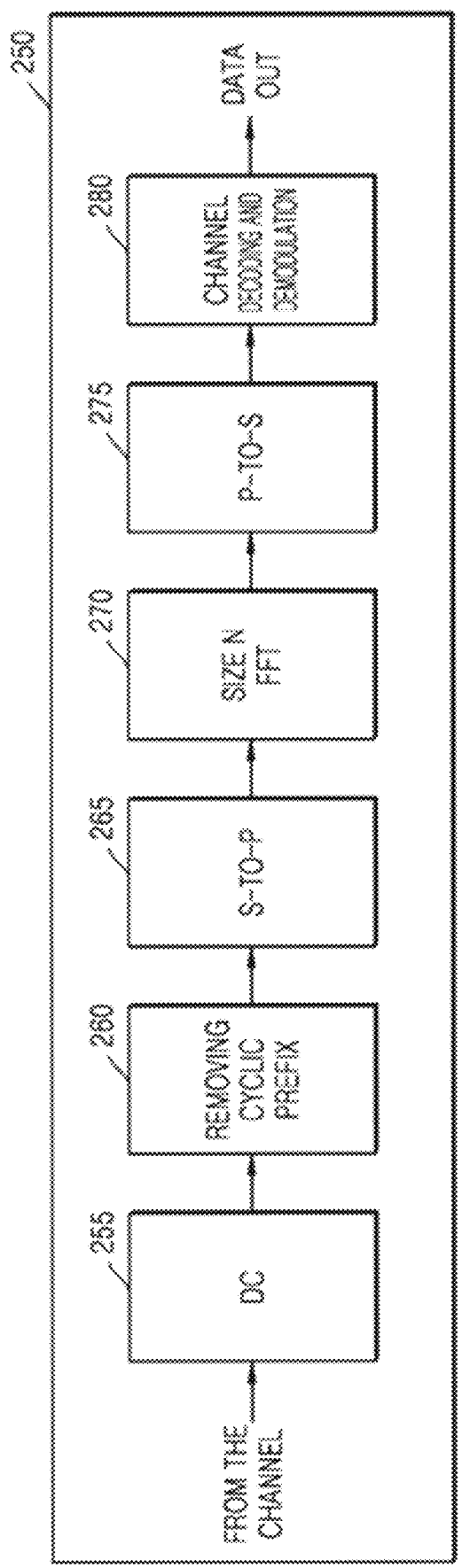
FIG. 2b illustrates example wireless transmission and reception paths according to the present disclosure.

FIGS. 2a and 2b illustrate example wireless transmission and reception paths according to the present disclosure. In the following description, the transmission path 200 can be described as being implemented in a gNB, such as the gNB 102, and the reception path 250 can be described as being implemented in a UE, such as the UE 116. However, it should be understood that the reception path 250 can be implemented in the gNB and the transmission path 200 can be implemented in the UE. In some embodiments, the reception path 250 is configured to support codebook design and structure for systems with 2D antenna arrays as described in embodiments of the present disclosure.

The transmission path 200 includes a channel coding and modulation block 205, a serial to parallel (S to P) block 210, a size N inverse fast Fourier transform (IFFT) block 215, a parallel to serial (P to S) block 220, an adding cyclic prefix block 225, and an up-converter (UC) 230. The reception path 250 includes a down converter (DC) 255, a removing cyclic prefix block 260, a serial to parallel (S to P) block 265, a size N fast Fourier transform (FFT) block 270, a parallel to serial (P to S) block 275, and a channel decoding and demodulation block 280.

In the transmission path 200, the channel coding and modulation block 205 receives a set of information bits, applies coding (such as low density parity check (LDPC) coding), and modulates input bits (such as using quadrature phase shift keying (QPSK) or quadrature amplitude modulation (QAM)) to generate a sequence of frequency domain modulation symbols. Serial-to-parallel (S-to-P) block 210 converts (such as demultiplexes) the serial modulation symbols into parallel data to generate N parallel symbol streams, where N is the IFFT/FFT size used in gNB 102 and UE 116. The size N IFFT block 215 performs IFFT operations on the N parallel symbol streams to generate a time domain output signal. Parallel-to-serial block 220 converts (such as multiplexes) the parallel time-domain output symbols from the size N IFFT block 215 to generate a serial time-domain signal. The adding cyclic prefix block 225 inserts a cyclic prefix into the time domain signal. The upconverter 230 modulates (such as up-converts) the output of the adding cyclic prefix block 225 to an RF frequency for transmission via a wireless channel. It is also possible to filter the signal at baseband before frequency conversion to RF frequency.

The RF signal transmitted from the gNB 102 arrives at the UE 116 after passing through the wireless channel, and operations opposite to that at the gNB 102 are performed at the UE 116. The downconverter 255 downconverts the received signal to a baseband frequency, and the removing cyclic prefix block 260 removes the cyclic prefix to generate a serial time domain baseband signal. The serial-to-parallel block 265 converts the time-domain baseband signal into a parallel time-domain signal. The size N FFT block 270 performs an FFT algorithm to generate N parallel frequency domain signals. The parallel-to-serial block 275 converts the parallel frequency domain signal into a sequence of modulated data symbols. The channel decoding and demodulation block 280 demodulates and decodes the modulated symbols to recover the original input data stream.

Each of the gNB 101-103 may implement a transmission path 200 similar to transmitting to the UE 111-116 in the downlink, and may implement a reception path 250 similar to receiving from the UE 111-116 in the uplink. Similarly, each of the UE 111-116 may implement a transmission path 200 for transmitting to the gNB 101-103 in the uplink and a reception path 250 for receiving from the gNB 101-103 in the downlink.

Each of the components in FIGS. 2a and 2b can be implemented using only hardware, or using a combination of hardware and software/firmware. As a specific example, at least some of the components in FIGS. 2a and 2b may be implemented in software, while other components may be implemented by configurable hardware or a mixture of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N can be any integer (such as 1, 2, 3, 4, etc.), while for FFT and IFFT functions, the value of variable N can be any integer as a power of 2 (such as 1, 2, 4, 8, 16, etc.).

Although FIGS. 2a and 2b illustrate examples of wireless transmission and reception paths, various changes may be made to FIGS. 2a and 2b. For example, various components in FIGS. 2a and 2b can be combined, further subdivided or omitted, and additional components can be added according to specific needs. Furthermore, FIGS. 2a and 2b are intended to illustrate examples of types of transmission and reception paths that can be used in a wireless network. Any other suitable architecture can be used to support wireless communication in a wireless network.

Figure 3A:
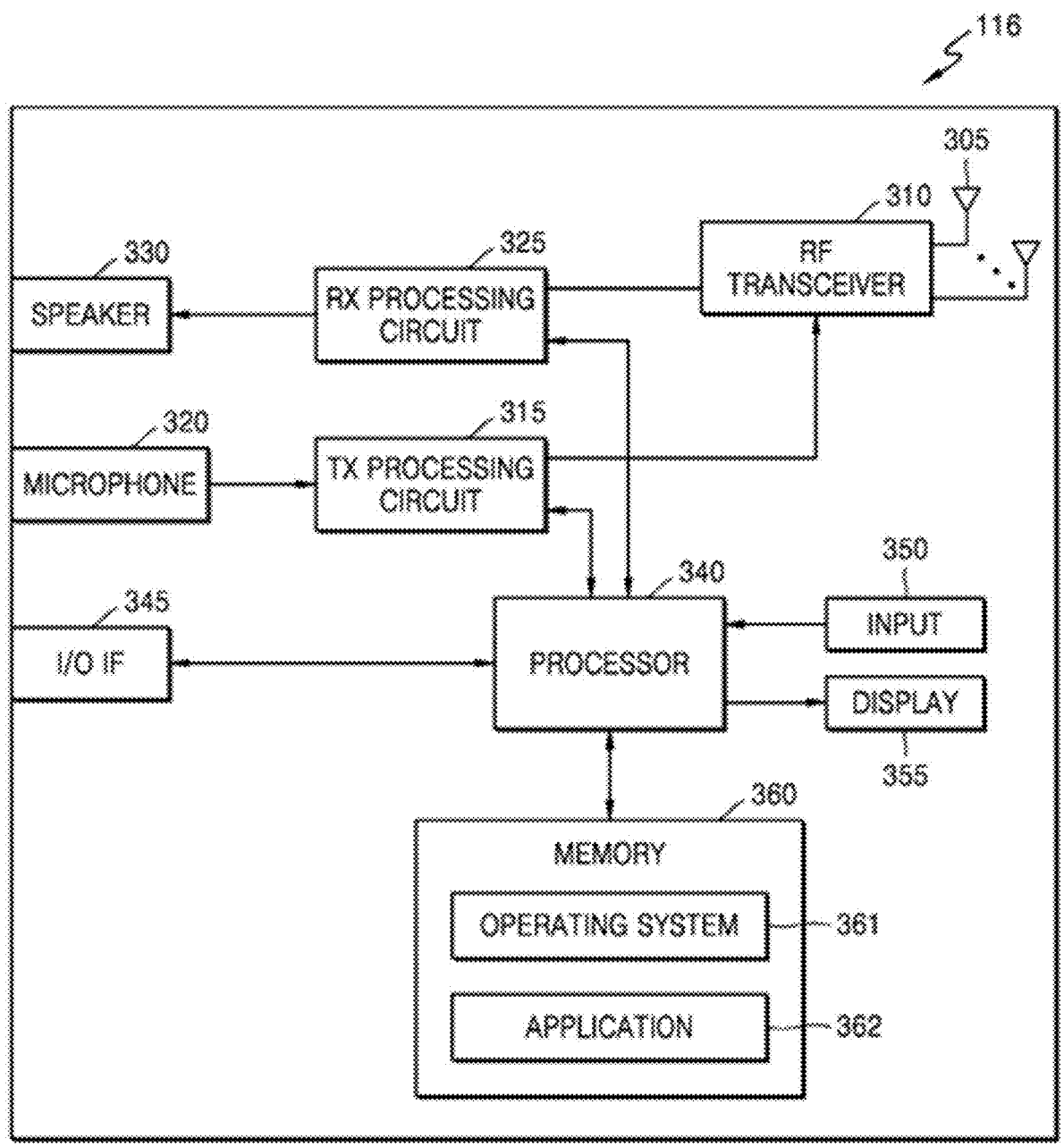
FIG. 3a illustrates an example user equipment UE according to the present disclosure.

FIG. 3a illustrates an example UE 116 according to the present disclosure. The embodiment of the UE 116 shown in FIG. 3a is for illustration only, and the UE 111-115 of FIG. 1 can have the same or similar configuration. However, the UE comes into a variety of configurations, and FIG. 3a does not limit the scope of the present disclosure to any specific implementation of the UE.

The UE 116 includes an antenna 305, a radio frequency (RF) transceiver 310, a transmit (TX) processing circuit 315, a microphone 320, and a receive (RX) processing circuit 325. The UE 116 also includes a speaker 330, a processor/controller 340, an input/output (I/O) interface 345, an input device (s) 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is transmitted to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor/controller 340 for further processing (such as for web browsing data).

The TX processing circuitry 315 receives analog or digital voice data from the microphone 320 or other outgoing baseband data (such as web data, e-mail, or interactive video game data) from the processor/controller 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor/controller 340 can include one or more processors or other processing devices and execute the OS 361 stored in the memory 360 in order to control the overall operation of the UE 116. For example, the processor/controller 340 could control the reception of forward channel signals and the transmission of reverse channel signals by the RF transceiver 310, the RX processing circuitry 325, and the TX processing circuitry 315 in accordance with well-known principles. In some embodiments, the processor/controller 340 includes at least one microprocessor or micro-controller.

The processor/controller 340 is also capable of executing other processes and programs resident in the memory 360, such as operations for channel quality measurement and reporting of systems with 2D antenna arrays as described in embodiments of the present disclosure. The processor/controller 340 can move data into or out of the memory 360 as required by an executing process. In some embodiments, the processor/controller 340 is configured to execute the applications 362 based on the OS 361 or in response to signals received from gNBs or an operator. The processor/controller 340 is also coupled to the I/O interface 345, which provides the UE 116 with the ability to connect to other devices, such as laptop computers and handheld computers. The I/O interface 345 is the communication path between these accessories and the processor 340.

The processor/controller 340 is also coupled to the input device (s) 350 and display 355. The operator of the UE 116 can use the input device (s) 350 to enter data into the UE 116. The display 355 may be a liquid crystal display, or other display capable of rendering text and/or at least limited graphics, such as from web sites. The memory 360 is coupled to the processor/controller 340. Part of the memory 360 could include a random access memory (RAM), and another part of the memory 360 could include a Flash memory or other read-only memory (ROM).

Although FIG. 3a shows one example of the UE 116, various changes can be made to FIG. 3a. For example, various components in FIG. 3 could be combined, further subdivided, or omitted and additional components could be added according to particular needs. As a particular example, the processor/controller 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 3B:
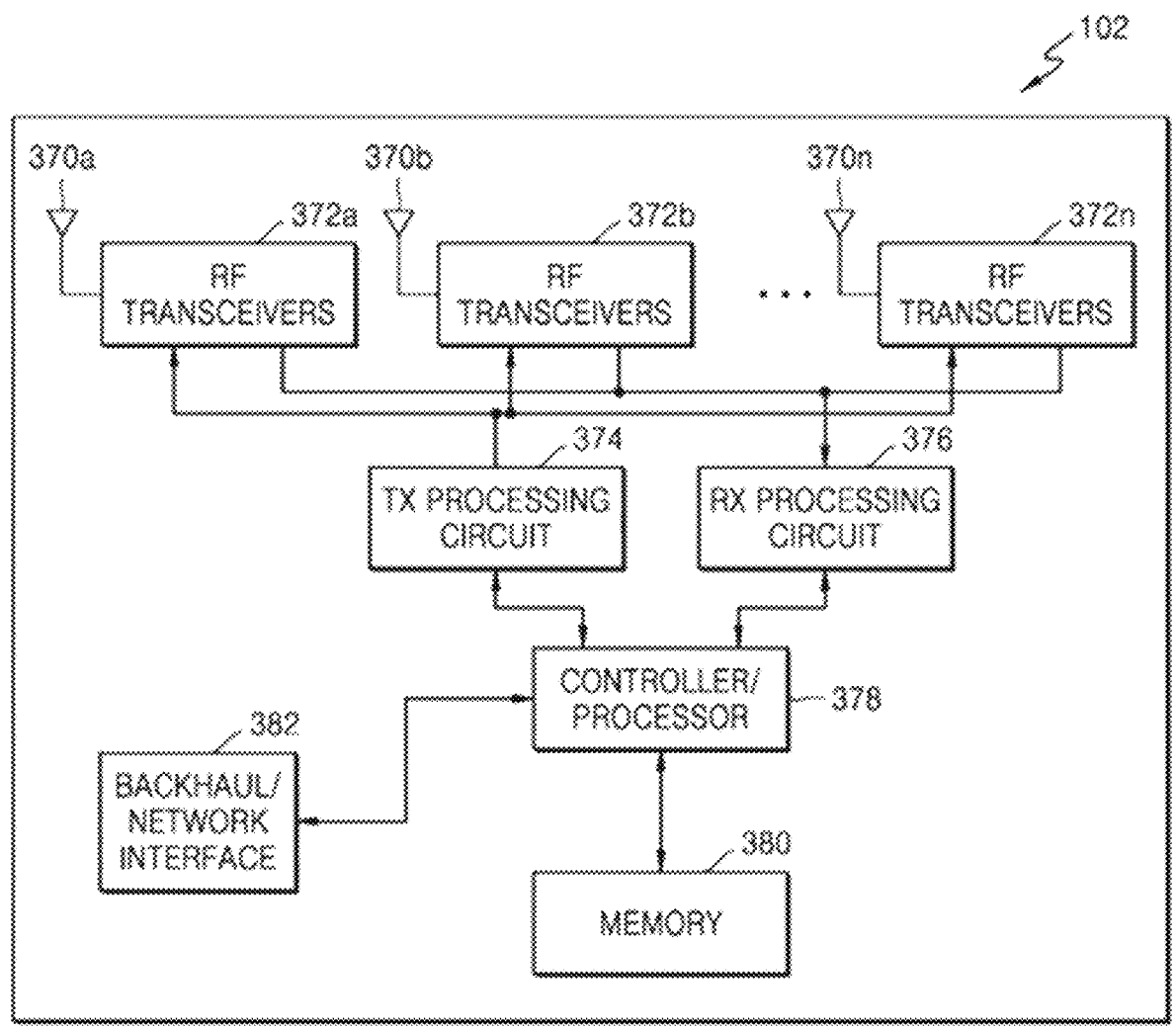
FIG. 3b illustrates an example base station gNB 102 according to the present disclosure.

FIG. 3b shows an example gNB 102 according to the present disclosure. The embodiment of the gNB 102 shown in FIG. 3b is for illustration only, and other gNBs of FIG. 1 can have the same or similar configuration. However, gNBs come into a variety of configurations, and FIG. 3b does not limit the scope of the present disclosure to any specific implementation of the gNBs. It should be noted that gNB 101 and gNB 103 can include the same or similar structures as gNB 102.

As shown in FIG. 3b, the gNB 102 includes a plurality of antennas 370a-370n, a plurality of RF transceivers 372a-372n, a transmit (TX) processing circuit 374, and a receive (RX) processing circuit 376. In certain embodiments, one or more of the plurality of antennas 370a-370n includes a 2D antenna array. gNB 102 also includes a controller/processor 378, a memory 380, and a backhaul or network interface 382.

RF transceivers 372a-372n receive incoming RF signals from antennas 370a-370n, such as signals transmitted by UEs or other gNBs. RF transceivers 372a-372n downconvert the incoming RF signals to generate IF or baseband signals. The IF or baseband signal is transmitted to the RX processing circuit 376, which generates a processed baseband signal by filtering, decoding and/or digitizing the baseband or IF signal. RX processing circuit 376 transmits the processed baseband signal to the controller/processor 378 for further processing.

TX processing circuit 374 receives analog or digital data (such as voice data, network data, email or interactive video game data) from the controller/processor 378. TX processing circuit 374 encodes, multiplexes and/or digitizes the outgoing baseband data to generate a processed baseband or IF signal. RF transceivers 372a-372n receive outgoing processed baseband or IF signals from the TX processing circuit 374 and up-convert the baseband or IF signals into RF signals for transmitting via antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can also support additional functions, such as higher-level wireless communication functions. For example, the controller/processor 378 can perform a blind interference sensing (BIS) process performed such as by a BIS algorithm, and decode the received signal from which the interference signal is subtracted. A controller/processor 378 may support any of a variety of other functions in the gNB 102. In some embodiments, the controller/processor 378 includes at least one microprocessor or microcontroller.

Controller/processor 378 is also capable of executing programs and other processes resident in memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTC. The controller/processor 378 can move data into or out of the memory 380 as required by the execution process.

The controller/processor 378 is also coupled to a backhaul or network interface 382. Backhaul or network interface 382 allows gNB 102 to communicate with other devices or systems through a backhaul connection or through a network. Backhaul or network interface 382 can support communication over any suitable wired or wireless connection (s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. Backhaul or network interface 382 includes any suitable structure that supports communication over a wired or wireless connection, such as an Ethernet or RF transceiver.

The memory 380 is coupled to the controller/processor 378. Part of the memory 380 can include RAM, while another part of the memory 380 can include flash memory or other ROM. In certain embodiments, a plurality of instructions, such as BIS algorithm, are stored in memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b shows an example of the gNB 102, various changes may be made to FIG. 3b. For example, the gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one per RF transceiver).

In addition, as described above, various embodiments of the present disclosure can also be applied to non-terrestrial networks NTN. In NTN, according to whether satellites have the ability to decode 5G signals, it can be divided into two scenarios: a scenario based on transparent payload; and a scenario based on regenerative payload. In a scenario based on transparent payload, a satellite does not have the ability to decode 5G signals, and the satellite directly transmits the received 5G signals transmitted by a ground terminal to a NTN gateway on the ground. In a scenario based on regenerative payload, a satellite has the ability to decode 5G signals. The satellite decodes the received 5G signals transmitted by a ground terminal, and then re-encodes and transmits the decoded data, which can be directly transmitted to a ground NTN gateway, or transmitted to other satellites, and then transferred from other satellites to the ground NTN gateway.

In order not to obscure the inventive concept of the present disclosure, a detailed description of the implementation details of the non-terrestrial network NTN is omitted here. In an embodiment of the present disclosure, a base station may be a satellite with decoding capability of base station (i.e., a scenario based on transparent payload) or a satellite without decoding capability of base station (i.e., a scenario based on regenerative payload). For the convenience of description, the satellites in NTN with or without decoding ability of base station are collectively described as base stations.

Example embodiments of the present disclosure are further described below with reference to the accompanying drawings.

The text and drawings are provided as examples only to help the readers understand the present disclosure. They do not intend to limit and should not be interpreted as limiting the scope of this disclosure in any way. Although certain embodiments and examples have been provided, based on the disclosure herein, it will be apparent to those skilled in the art that changes may be made to the illustrated embodiments and examples without departing from the scope of the disclosure.

The following takes the NTN network as an example for illustration, but it can be understood that this disclosure is not limited to the NTN network.

In the high frequency transmission scenario, in order to improve the receiving energy and coverage range of wireless signals, the base station needs to use analog beamforming technology. A beam footprint is the coverage range of downlink beamforming signals, and the base station can provide coverage of multiple beam footprints through multi-directional analog beamforming.

Taking the NTN network as an example, because the relative moving speed between a low-orbit satellite and a ground terminal is very fast, the ground terminal may pass through the coverage range of a beam footprint in a very short time, that is, the ground terminal needs to perform the beam footprint handover frequently. In actual networking, if the coverage range of one beam footprint corresponds to one cell, that is, the adjacent beam footprints use different physical cell ID (PCI), the ground terminal will perform frequent handover between cells, which will bring huge signaling overhead.

The embodiment of the disclosure provides a method for beam footprint handover performed by a terminal, comprising: receiving a first signaling, the first signaling is used for instructing the terminal to hand over from a first beam footprint to a second beam footprint; handing over from the first beam footprint to the second beam footprint in response to the first signaling; wherein a beam footprint is a coverage range of downlink beamforming signals, the first beam footprint and the second beam footprint belong to a same cell, downlink signals within the first beam footprint are transmitted with the first beam and downlink signals within the second beam footprint are transmitted with the second beam. In this method, multiple adjacent beam footprints use a same PCI, so that the beam footprint handover can be regarded as mobility management within a cell, and the system can also control the beam footprint handover process based on Layer 1 and/or Layer 2 signaling, such that the overall signalling overhead is reduced, and delay during the beam footprint handover is improved.

In addition, in order to further avoid the homo-frequency interference between adjacent beam footprints, in the embodiment of this disclosure, the adjacent beam footprints can use different frequency bands, that is, there is a corresponding relationship between beam footprints and frequency bands. When a handover occurs for the beam footprints, the corresponding frequency bands will also be switched. For example, if multiple adjacent beam footprints use a same PCI, the adjacent beam footprints can use bandwidth parts (BWP) at different frequency domain locations within the cell system bandwidth.

In addition, the related technical details about beam footprint handover and/or corresponding frequency band handover are still unclear at present, and the embodiments of the present disclosure at least partially solve the above technical problems.

First, the correlation among beam footprints, beam IDs and frequency bands in the embodiments of the present disclosure will be described below.

As mentioned above, the beam footprint is the coverage range of downlink beamforming signals, and the base station can provide coverage range of multiple beam footprints through multiple beam directions (e.g., analog beam directions). In order to avoid the homo-frequency interference between adjacent beam footprints, the adjacent beam footprints should use different frequency resources, that is, the transmission frequency bands of adjacent beam footprints do not overlap. In addition, in NTN networks, because of the weak hardware capability of satellite base stations, satellite base stations may not be able to dynamically change the analog beam direction, that is, the analog beam direction corresponding to one beam footprint is almost unchanged.

To sum up, in order to simplify the system design, as an embodiment, one beam footprint is associated with one beam (i.e., a beam ID) and one frequency band, that is, for a period of time, transmission signals within one beam footprint are always transmitted with the associated beam in the associated frequency band.

For example, adjacent beam footprints can use different frequency bands within cell system bandwidths. Therefore, the concept of bandwidth part (BWP) in the current new radio (NR) system can be reused or used for reference, that is, one beam footprint can be associated with one BWP, and adjacent beam footprints can be associated with different BWPs. Note that for the convenience of description, the BWP described herein only represents a broad concept of a part of frequency bands within the cell system bandwidth, which may be different from the BWP configuration and functions of existing systems. One beam footprint being associated with one BWP refers to one beam footprint being associated with a part of frequency bands within the cell system bandwidth, while adjacent beam footprints being associated with different BWPs refers to adjacent beam footprints being associated with different part of frequency bands within the cell system bandwidth.

In an embodiment, a serving cell may include multiple beam footprints, that is, the multiple beam footprints have a same PCI, one beam footprint corresponds to one analog beam direction, each beam footprint in a cell corresponds to a different analog beam direction, one beam footprint is associated with one frequency band, and adjacent beam footprints are associated with different frequency bands, while non-adjacent beam footprints can be associated with same frequency bands.

First, a method for receiving information performed by a terminal in an embodiment of the present disclosure will be described, and the method may include:

receiving broadcast channels/signals and/or reference signals for beam footprint handover measurement according to at least one of the following ways, based on frequency band information associated with beam footprints and/or cell common frequency band information:

receiving the broadcast channels/signals and/or the reference signals for the beam footprint handover measurement transmitted with corresponding beamforming on the frequency band associated with a serving beam footprint;

switching from a frequency band associated with the serving beam footprint to a frequency band associated with an adjacent beam footprint to receive the reference signals for the beam footprint handover measurement transmitted with the corresponding beamforming; or switching from the frequency band associated with the serving beam footprint to the cell common frequency band to receive the broadcast channels/signals and/or the reference signals for the beam footprint handover measurement, wherein the broadcast channels/signals and/or the reference signals for the beam footprint handover measurement are transmitted in turn with beam sweeping on the cell common frequency band.

Herein, the serving beam footprint is a coverage range of beamforming signals currently serving the terminal. Specifically, the serving beam footprint refers to a beam footprint that provides data transmission services for the terminal, that is, the terminal is within the coverage range of the beam footprint and the terminal performs data transmission through the frequency band associated with the serving beam footprint, for example, receiving unicast physical downlink control channel (PDCCH) and unicast physical downlink shared channel (PDSCH) on the frequency band of the serving beam footprint. The adjacent beam footprint is a beam footprint geographically adjacent to the serving beam footprint.

Herein, a cell common coverage region refers to a coverage region containing multiple beam footprints, within which the base station provides transmission of cell common signals such as SSB, RMSI, etc. The signal transmission in the common coverage region does not correspond to a certain analog beam direction, but is transmitted based on the way of beam sweeping, that is, the same signal is transmitted by beamforming in turn in different analog beam directions. Because the analog beam direction needs to be changed, the signal transmission of the base station in the common coverage region requires higher hardware capability and antenna capability than the signal transmission in the beam footprints. Because the common coverage region is only used for a small amount of common signal transmission, the base station can also accept the extra capability required. The frequency band used in the cell common coverage region can be called a common frequency band or an initial frequency band.

Figure 4:
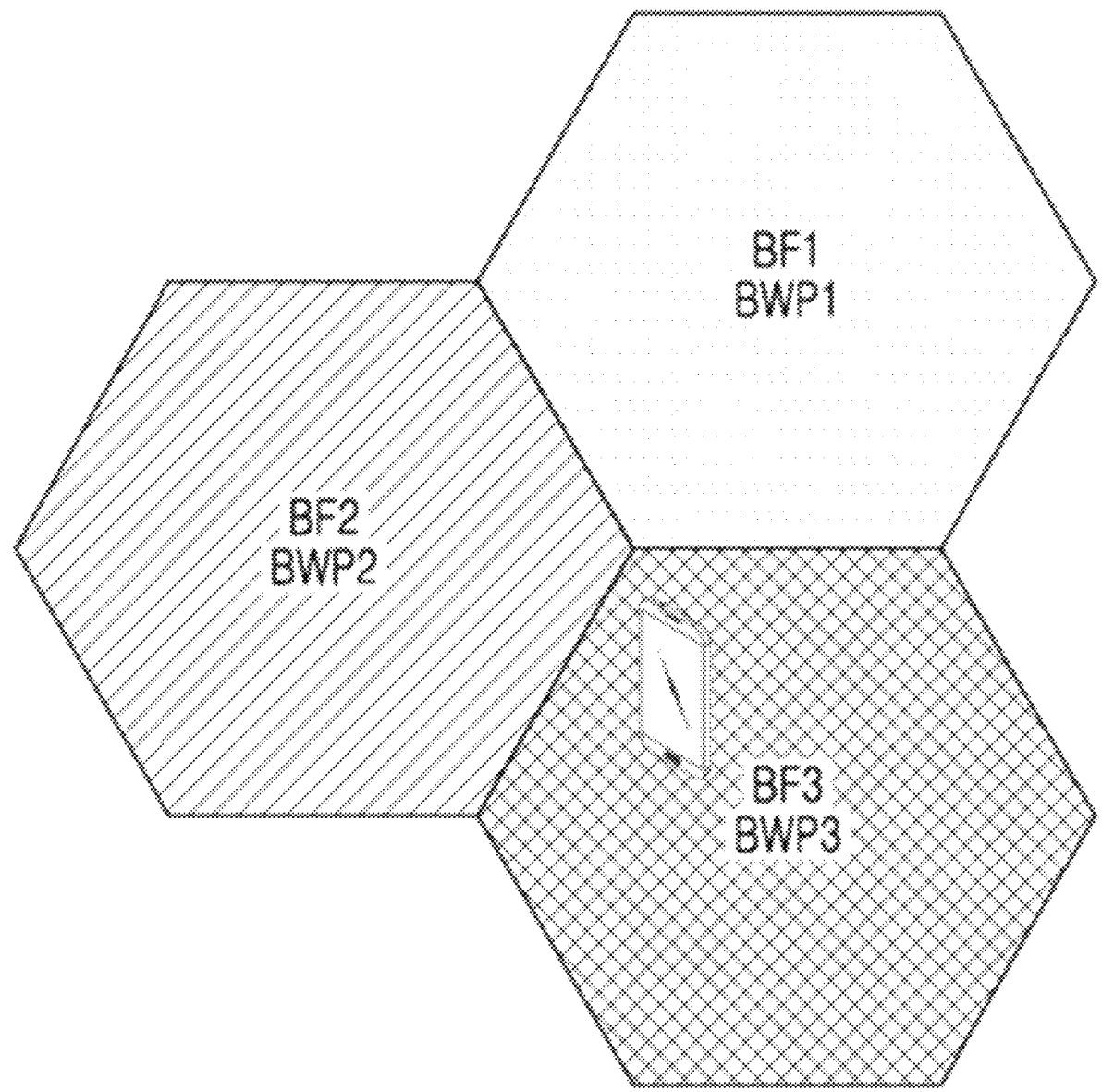
FIG. 4 illustrates a schematic diagram of a serving beam footprint and adjacent beam footprints according to an embodiment of the present disclosure.

Next, taking FIG. 4 as an example, the serving beam footprint and the adjacent beam footprints will be further explained. Please refer to FIG. 4, which illustrates a schematic diagram of a serving beam footprint and adjacent beam footprints according to an embodiment of the present disclosure. As shown in FIG. 4, the terminal is within the coverage range of beam footprint 3 (BF3), so BF3 is the serving beam footprint, and beam footprint 1 (BF1) and beam footprint 2 (BF2) are adjacent beam footprints. The serving beam footprint can also be called the belonged beam footprint or the located beam footprint.

The frequency band associated with a beam footprint is described in detail below.

Optionally, the frequency band associated with a beam footprint as described above can reuse the concept and function of the existing bandwidth part BWP of NR system, but the specific configuration scheme of the BWP may be different. To show the difference, the frequency band associated with the beam footprint herein can be called BF-BWP (Beam Footprint-BandwidthPart), which is the actual transmission frequency band of all terminals within the beam footprint, that is, all terminals within the beam footprint transmit signals based on the BF-BWP. In this scheme, all terminals within the beam footprint use the same radio frequency bandwidth, subcarrier spacing and CP type, that is, the system cannot distinguish the transmission bandwidth according to the different radio frequency bandwidth capabilities of the terminals.

With regard to the specific configuration of the BF-BWP, the configuration information of the BWP in the existing NR system can be used for reference. Taking the downlink BWP as an example, a BF-BWP includes a common parameter BWP-DownlinkComm and a dedicated parameter BWP-DownlinkDedicated, herein, the BWP-DownlinkComm includes general parameter configuration of the BF-BWP (such as frequency domain locations and bandwidth, subcarrier spacing and CP type), PDCCH common configuration pdcch-ConfigCommon, PDSCH common configuration pdsch-ConfigCommon, etc. The BWP-DownlinkDedicated includes PDCCH related configuration pdcch-Config, PDSCH related configuration pdsch-Config, SPS related configuration sps-Config, radio link monitoring related configuration radioLinkMonitoringConfig, etc. The base station can configure the common parameter BWP-DownlinkComm of the BF-BWP associated with each beam footprint in the cell through broadcast signaling and configure the dedicated parameter BWP-DownlinkDedicated of BF-BWP associated with the serving beam footprint of the terminal through UE-specific RRC signaling; or, the base station configures the common parameter BWP-DownlinkComm and the dedicated parameter BWP-DownlinkDedicated of BF-BWP associated with the serving beam footprint of the terminal through UE-specific RRC signaling.

As mentioned above, the terminal may perform beam footprint handover in the same cell frequently, which also means BF-BWP handover. In order to avoid reconfiguration of transmission parameters caused by BF-BWP handover, the configuration information of BF-BWP can only include basic configuration, for example, only frequency domain locations and bandwidth, subcarrier spacing and CP type are included. However, the specific configuration information of downlink transmission (including common configuration information and dedicated configuration information) can be independent of the BF-BWP, that is, when BF-BWP handover is caused by a beam footprint handover, the specific configuration information of downlink transmission can be reused, that is, it is still applicable in the new BF-BWP without reconfiguration. Optionally, the BF-BWP associated with each beam footprint in the cell uses the same bandwidth, subcarrier spacing and CP type, but different frequency domain locations, so there is no problem to reuse the specific configuration information of downlink transmission after the BF-BWP handover. Optionally, the BF-BWP associated with each beam footprint in the cell can use a different bandwidth, subcarrier spacing and CP type, so it is necessary to predefine some rules to make it possible to reuse the specific configuration information of downlink transmission in the new BF-BWP.

Optionally, the above-mentioned frequency band associated with the beam footprint as described above can be different from the existing BWP concept of NR system. To show the difference, the frequency band associated with the beam footprint can be called BF-FR (Beam Footprint-Frequency Range) herein. The BF-FR is not the actual transmission frequency band of terminals in the beam footprint. The base station can configure a respective transmission frequency band for each terminal in the beam footprint in the BF-FR frequency band, and the bandwidth of the transmission frequency band can be less than or equal to the bandwidth of BF-FR. In this scheme, the terminals in a beam footprint can use different radio bandwidths, subcarrier spacing and/or CP types, that is, the system can distinguish the transmission bandwidth according to the different radio bandwidth capabilities of the terminals.

Correspondingly, the configuration information of BF-FR can only include frequency domain locations and bandwidth information, but does not include any specific configuration information of downlink transmission, such as specific frequency domain locations of transmission frequency band (within BF-FR), specific bandwidth information of transmission frequency band (within BF-FR), subcarrier spacing, CP type, common configuration information of downlink transmission, dedicated configuration information of downlink transmission, etc. Herein, the BF-FR is similar to the system bandwidth concept of cells in the existing NR system. The base station can configure one BWP for signal transmission for the terminal in the BF-FR frequency band associated with the serving beam footprint, or configure multiple BWPs and activate one of them for signal transmission, and reuse the BWP concept and configuration information of the existing NR system.

Optionally, each beam footprint is associated with one downlink frequency band and one uplink frequency band, that is, adjacent beam footprints use different downlink frequency bands and different uplink frequency bands, so adjacent beam footprints can be associated with downlink frequency bands at different frequency domain locations and uplink frequency bands at different frequency domain locations, herein, the associated downlink frequency bands and uplink frequency bands can use the above BF-BWP configuration method or BF-FR configuration method.

Optionally, a beam footprint is only associated with one downlink frequency band, and there is no need to associate with one uplink frequency band, that is, adjacent beam footprints can use different downlink frequency bands and a same uplink frequency band, and uplink homo-interference between adjacent beam footprints can be avoided through resource scheduling of the base station, so adjacent beam footprints can be associated with downlink frequency bands at different frequency domain locations, herein the associated downlink frequency bands can use the above BF-BWP configuration method or BF-FR configuration method.

In the current NR system, UE can be configured with an initial transmission frequency band (i.e., initial BWP) and up to four additional dedicated transmission frequency bands (i.e., dedicated BWPs) through higher layer signaling, but UE can receive or transmit signals on only one transmission frequency band, which is called active transmission frequency band (i.e., BWP). The base station can switch the active transmission frequency bands among up to four transmission frequency bands through DCI, and the configuration of transmission frequency bands in beam footprint scenario can be different from those in the existing NR system.

Optionally, the UE in the beam footprint is configured, through higher layer signaling, with only one transmission frequency band for actual transmission, that is, the active transmission frequency band. When the frequency band associated with a beam footprint uses the above BF-BWP configuration method, the active transmission frequency band is BF-BWP; or when the frequency band associated with a beam footprint uses the above BF-FR configuration method, the active transmission frequency band is the BWP included in the BF-FR frequency band. When the serving beam footprint hands over, the active transmission frequency band needs to be reconfigured through higher layer signaling.

Optionally, the UE is configured with multiple transmission frequency bands through higher layer signaling, and switching the active transmission frequency bands among the multiple transmission frequency bands through DCI or a MAC CE. When the frequency band associated with a beam footprint uses the above BF-BWP configuration method, the multiple transmission frequency bands configured for the UE can be multiple BF-BWPs corresponding to different beam footprints. When the UE is in the coverage range of a certain beam footprint, the corresponding BF-BWP is used as the active transmission frequency band, so the BF-BWP switching indicated by DCI or a MAC CE can implicitly indicate the handover of the corresponding beam footprint, that is, there is no need for dedicated signaling to indicate the handover of the beam footprint; or, when the frequency band associated with a beam footprint uses the above BF-FR configuration method, the multiple transmission frequency bands configured for the UE can be multiple BWPs within the BF-FR bandwidth, so the UE can switch the active transmission frequency bands within the same beam footprint. When the beam footprint handover occurs, the multiple transmission frequency bands of UE need to be reconfigured due to the change of the associated BF-FR. Herein, the BWP switching indicated by DCI or a MAC CE cannot implicitly indicate the handover of beam footprint, and dedicated signalling is needed to indicate the handover of beam footprint; or, when the frequency band associated with a beam footprint uses the above BF-FR configuration method, a part of the transmission frequency bands configured for the UE can be BWP within the BF-FR bandwidth of the serving beam footprint, and the other part of the transmission frequency bands can be the BWP within the BF-FR bandwidths of the adjacent beam footprints. When the BWP switching indicated by DCI or a MAC CE corresponds to different beam footprints, the BWP switching can imply beam footprint handover, that is, there is no need for using dedicated signaling to indicate beam footprint handover.

As an embodiment, the frequency band information associated with the beam footprints is acquired according to at least one of the following methods:

acquiring frequency band information associated with each beam footprint in a cell by receiving a signaling broadcast by a base station, and acquiring frequency band information associated with the serving beam footprint and/or frequency band information associated with the adjacent beam footprint from the frequency band information associated with each beam footprint; or acquiring the frequency band information associated with the serving beam footprint and/or the frequency band information associated with the adjacent beam footprint by receiving the UE specific signaling transmitted by the base station.

Specifically, for example, the base station may configure frequency band information associated with each beam footprint through broadcast signaling, for example, the frequency band information may include at least one of the following information: frequency band location information; frequency band bandwidth information; subcarrier spacing information; cyclic prefix type information; configuration information of downlink common transmission in frequency band; for example related configuration information of broadcast PDCCH/PDSCH transmission such as SIB, RAR, Paging, etc.

In this way, the base station only needs to broadcast signaling once, so that all terminals in the cell can obtain the frequency band information associated with each beam footprint, that is, the terminals can obtain the frequency band information associated with the serving beam footprint and/or the frequency band information associated with the adjacent beam footprints from these frequency band information. When the serving beam footprint of the terminal hands over, the frequency band information associated with the serving beam footprint and/or the frequency band information associated with the adjacent beam footprints configured by broadcast does not need to be reconfigured, so as to reduce the signalling overhead of the transmission frequency band information reconfiguration caused by the bean footprint handover.

As another example, the base station may configure the frequency band information associated with the serving beam footprint and/or the frequency band information associated with the adjacent beam footprints by transmitting UE specific signaling to the terminal.

Specifically, for example, the base station may configure the frequency band information associated with the serving beam footprint and the frequency band information associated with the adjacent beam footprints to the terminal through UE specific RRC signaling, and the frequency band information may include at least one of the following information: frequency band location information; frequency band bandwidth information; subcarrier spacing information; cyclic prefix type information; configuration information of downlink common transmission in frequency band, for example, including related configuration information of broadcast PDCCH/PDSCH transmission such as SIB, RAR, paging, etc.; configuration information of downlink dedicated transmission in frequency band, such as related configuration information of unicast PDCCH/PDSCH.

In this way, when the serving beam footprint of the terminal hands over, the frequency band information associated with the serving beam footprint and/or the frequency band information associated with the adjacent beam footprints of the terminal may need to be reconfigured.

As an embodiment, broadcast channels/signals include, but are not limited to, synchronization signal blocks (SSB), residual minimum system information (RMSI), other system information blocks (SIBs), or paging information, herein, the SIBs refers to system information blocks other than RMSI.

As an embodiment, the reference signal for beam footprint handover measurement includes but is not limited to the channel state information reference signal (CSI-RS), etc.

Next, the method for receiving information provided by an embodiment of the disclosure will be described in detail with reference to FIGS. 5 to 10.

Figure 5:
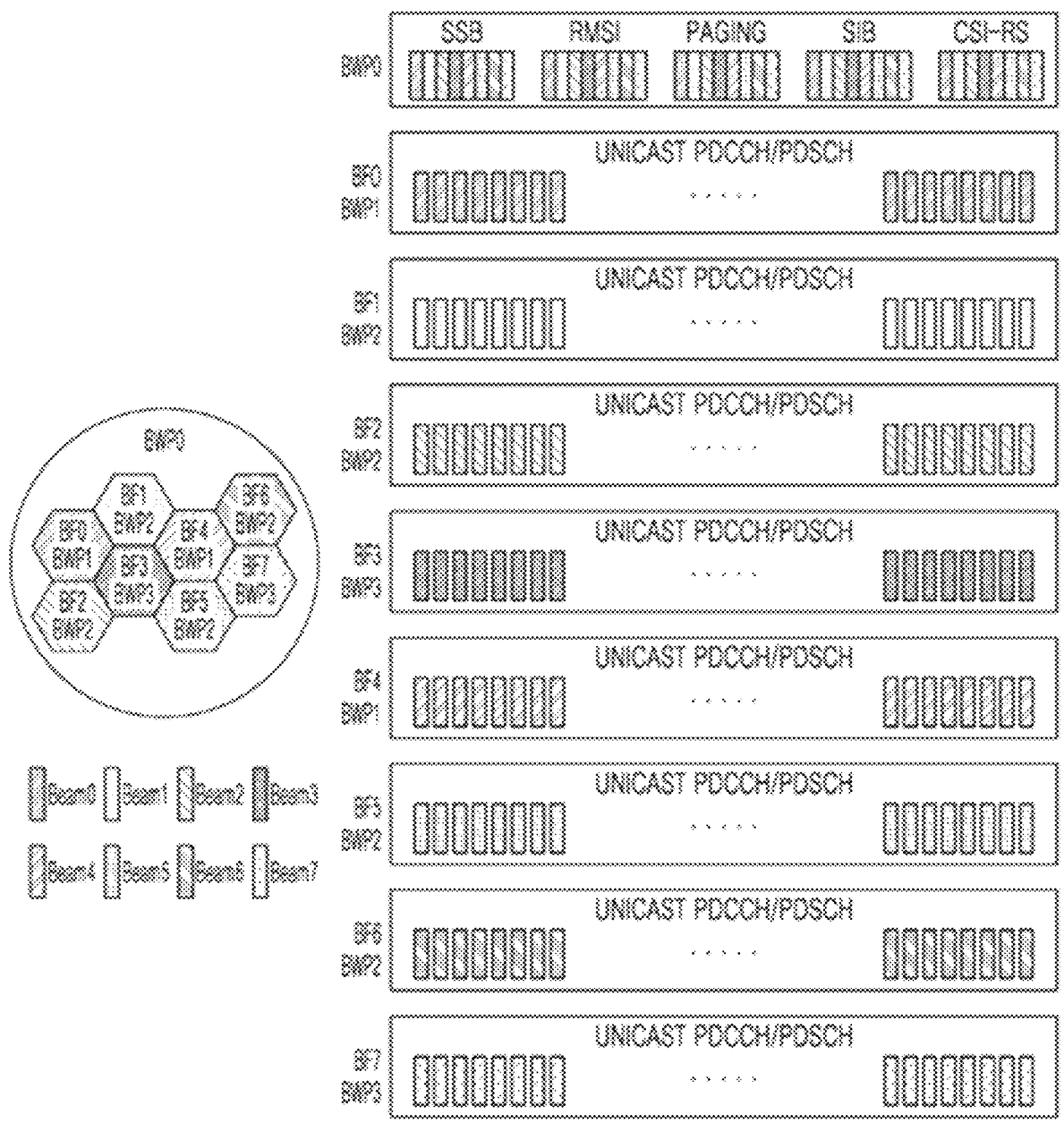
FIG. 5 illustrates a schematic diagram of a method for receiving information performed by a terminal according to an embodiment of the present disclosure.

Please refer to FIG. 5, which illustrates a schematic diagram of a method for receiving information performed by a terminal according to an embodiment of the present disclosure.

As shown in FIG. 5, the corresponding relationship between the beam footprint and the frequency band is only reflected in unicast PDCCH/PDSCH transition, while the broadcast channels/signals (such as synchronization signal blocks (SSBs), residual minimum system information (RMSI), other system information blocks (SIBs), or paging information, etc.) and/or reference signals (such as CSI-RS) for beam footprint handover measurement are transmitted in turn with different beamforming on the cell common frequency band, that is, transmitted in the form of beam sweeping.

As shown in FIG. 5, assuming that there are 8 beam footprints (BF0~BF7) in the cell, and each beam footprint corresponds to a coverage range of one analog beam, that is, different beam footprints correspond to analog beams in different directions, for example, beam footprint 0 (BF0) uses analog beam 0, beam footprint 1 (BF1) uses analog beam 2 (BF1), beam footprint 2 (BF2) uses analog beam 2 (BF2), and the like. The cell supports 8 analog beams in total, corresponding to 8 beam footprints, respectively. In order to avoid the homo-interference between adjacent beam footprints, the adjacent beam footprints can use different frequency bands, for example, they are configured to use bandwidth parts BWP with different frequency domain locations, for example, BF0 uses BWP1, while adjacent BF1 and BF3 use BWP2 and BWP3, respectively.

Adjacent beam footprints can use BWPs at different frequency domain locations to reduce homo-interference, but in order to improve the utilization rate of frequency resources, beam footprints with certain intervals can use a BWP at the same frequency domain location. For example, BF0 and BF4 can use BWP1 at the same frequency domain location. While the BWP1 used on BF0 and BWP1 used on BF4 have the same frequency domain location, other numerology configurations thereof may be the same or different, for example, subcarrier spacing configurations may be the same or different. Similarly, BF1, BF2, BF5 and BF6 may use BWP2 at the same frequency domain location, and BF3 and BF7 may use BWP3 at the same frequency domain location.

It can be understood that the frequency band information that can be used by adjacent beam footprints is not limited to the concept of bandwidth part BWP, and the figure is only an example.

From the terminal's point of view, within the serving beam footprint, there is a one-to-one relationship between frequency bands and beams for unicast PDCCH/PDSCH transmission, but from the base station's point of view, within the area of a cell, frequency bands at the same frequency domain location (numerology configuration may be different) can be transmitted with beamforming in different directions on different beam footprints, which can be understood as a one-to-multiple relationship between frequency bands and beams.

As shown in FIG. 5, a terminal within the coverage range of a specific beam footprint receives unicast PDCCH/PDSCH on the BWP corresponding to the beam footprint. For example, a UE within the coverage range of BF0 receives unicast PDCCH/PDSCH through BWP1, which can be regarded as the active BWP in the existing NR system for communication after RRC connection state is established.

In addition, BWP0 is the cell common frequency band, which is used for the transmission of the above-mentioned broadcast channels/signals, and has the coverage range of the whole cell, that is, SSB, RMSI, Paging, SIB and CSI-RS are transmitted on BWP0 in the form of beam sweeping. In this example, beam sweeping means that the above-mentioned broadcast channels/signals are transmitted in turn with different beamforming on eight analog beams supported by the cell. BWP0 can be regarded as the initial BWP in the existing NR system, which is used for the initial access to the cell. For receiving the broadcast channels/signals and the reference signals for beam footprint handover measurement, the terminal needs to switch from the frequency band associated with the serving beam footprint to the cell common frequency band to receive the broadcast channels/signals and the reference signals for beam footprint handover measurement. That is, the terminal needs to switch from BWP1 to BWP0 to receive SSB, RMSI, Paging, SIB and CSI-RS.

Figure 6:
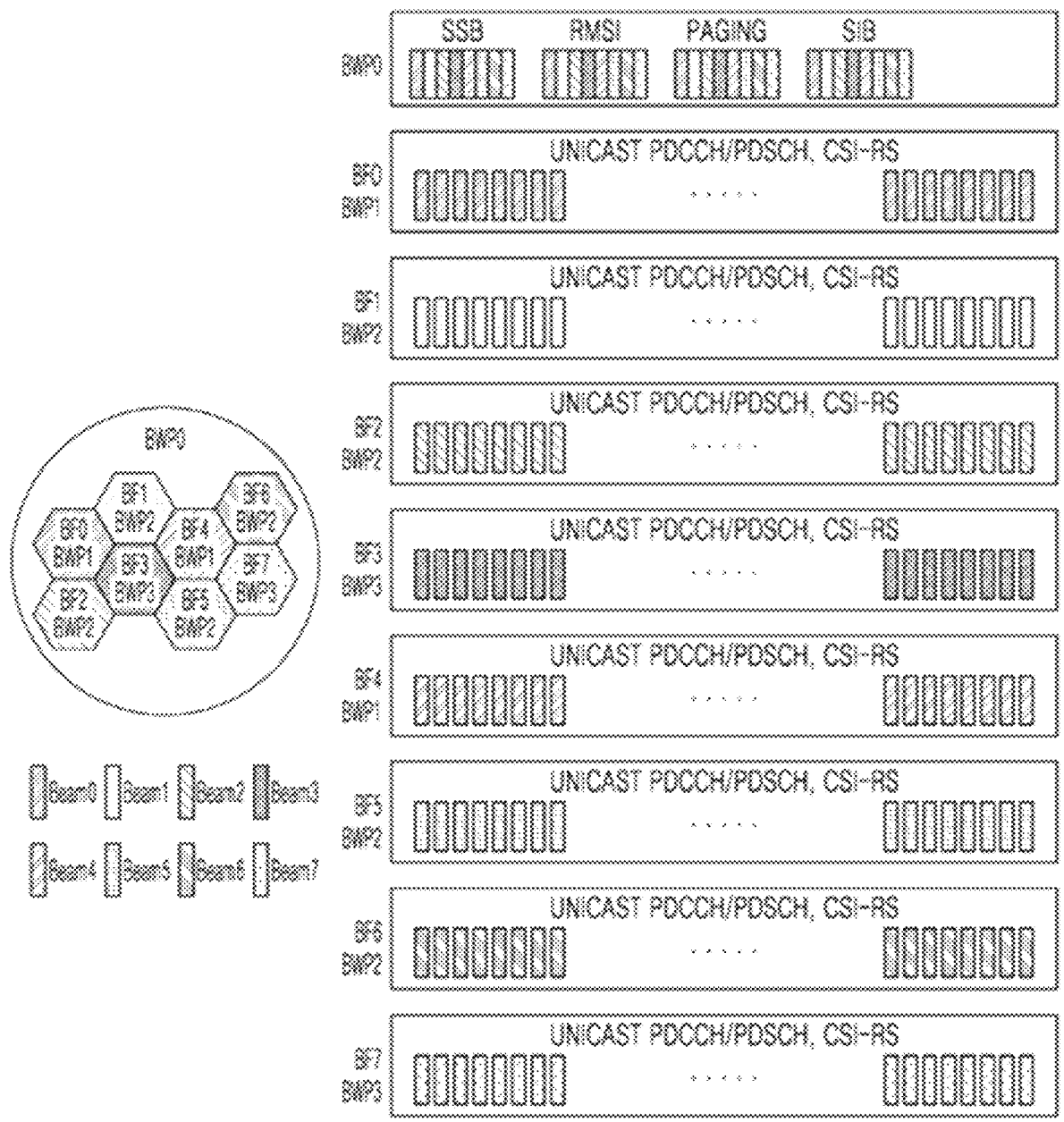
FIG. 6 illustrates a schematic diagram of a method for receiving information performed by a terminal according to an embodiment of the present disclosure.

Please refer to FIG. 6, which illustrates a schematic diagram of a method for receiving information performed by a terminal according to an embodiment of the present disclosure.

As shown in FIG. 6, the corresponding relationship between the beam footprints and the frequency bands is only reflected in the transmission of unicast PDCCH/PDSCH and CSI-RS, while the broadcast channels/signals (such as synchronization signal blocks (SSBs), residual minimum system information (RMSI), other system information blocks (SIBs), or Paging information, etc.) are transmitted in turn with different beamforming on the cell common frequency band, that is, transmitted in the form of beam sweeping.

As shown in FIG. 6, FIG. 6 is similar to FIG. 5, and the difference is that CSI-RS is transmitted by using the analog beamforming corresponding to a beam footprint. If the terminal needs to measure CSI-RS on other beamforming, it needs to switch to the other frequency band (BWP as an example in the figure) for measurement. For example, if the terminal belonging to the coverage range of BF0 wants to measure CSI-RS on Beam1, it needs to switch from BWP1 to BWP2. If it needs to measure CSI-RS on Beam4, no BWP switching is needed.

Figure 7:
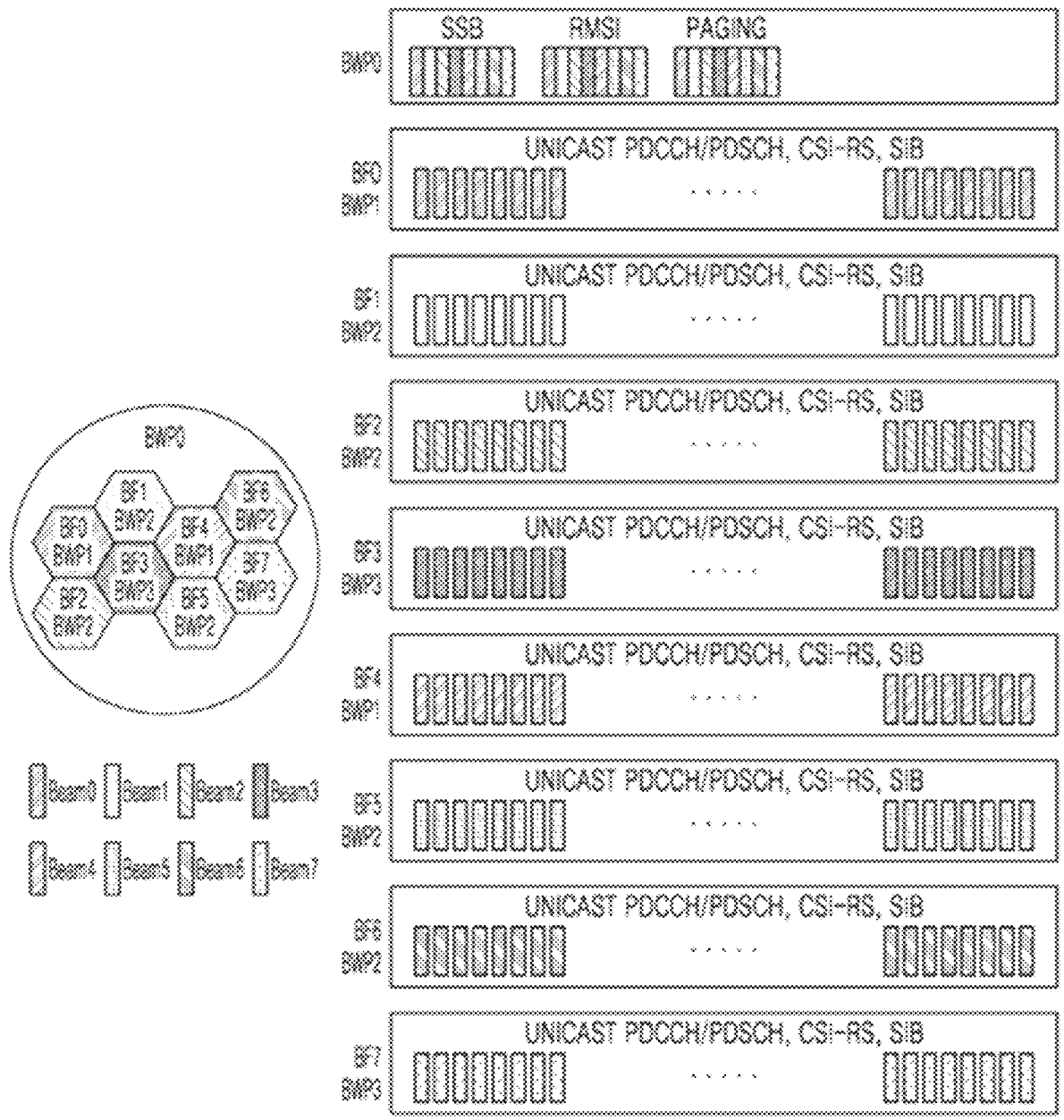
FIG. 7 illustrates a schematic diagram of a method for receiving information performed by a terminal according to an embodiment of the present disclosure.

Please refer to FIG. 7, which illustrates a schematic diagram of a method for receiving information performed by a terminal according to an embodiment of the present disclosure.

As shown in FIG. 7, the corresponding relationship between the beam footprints and the frequency bands is only reflected in the transmission of unicast PDCCH/PDSCH, CSI-RS and SIB, while the other broadcast channels/signals (such as synchronization signal blocks (SSBs), residual minimum system information (RMSI), or Paging information, etc.) are transmitted in turn with different beamforming on the cell common frequency band, that is, transmitted in the form of beam sweeping.

As shown in FIG. 7, FIG. 7 is similar to FIG. 6, except that CSI-RS is transmitted by using the analog beamforming corresponding to a beam footprint, and system information SIB other than RMSI is also transmitted by using the analog beamforming corresponding to a beam footprint, that is, the terminal can receive the SIB on the frequency band used for unicast PDCCH/PDSCH transmission (shown as BWP as an example in the figure) without switching to other frequency bands to receive SIBs, for example, the terminal within the coverage range of BF0 receives SIBs on BWP1 without switching to BWP0 to receive SIBs.

Figure 8:
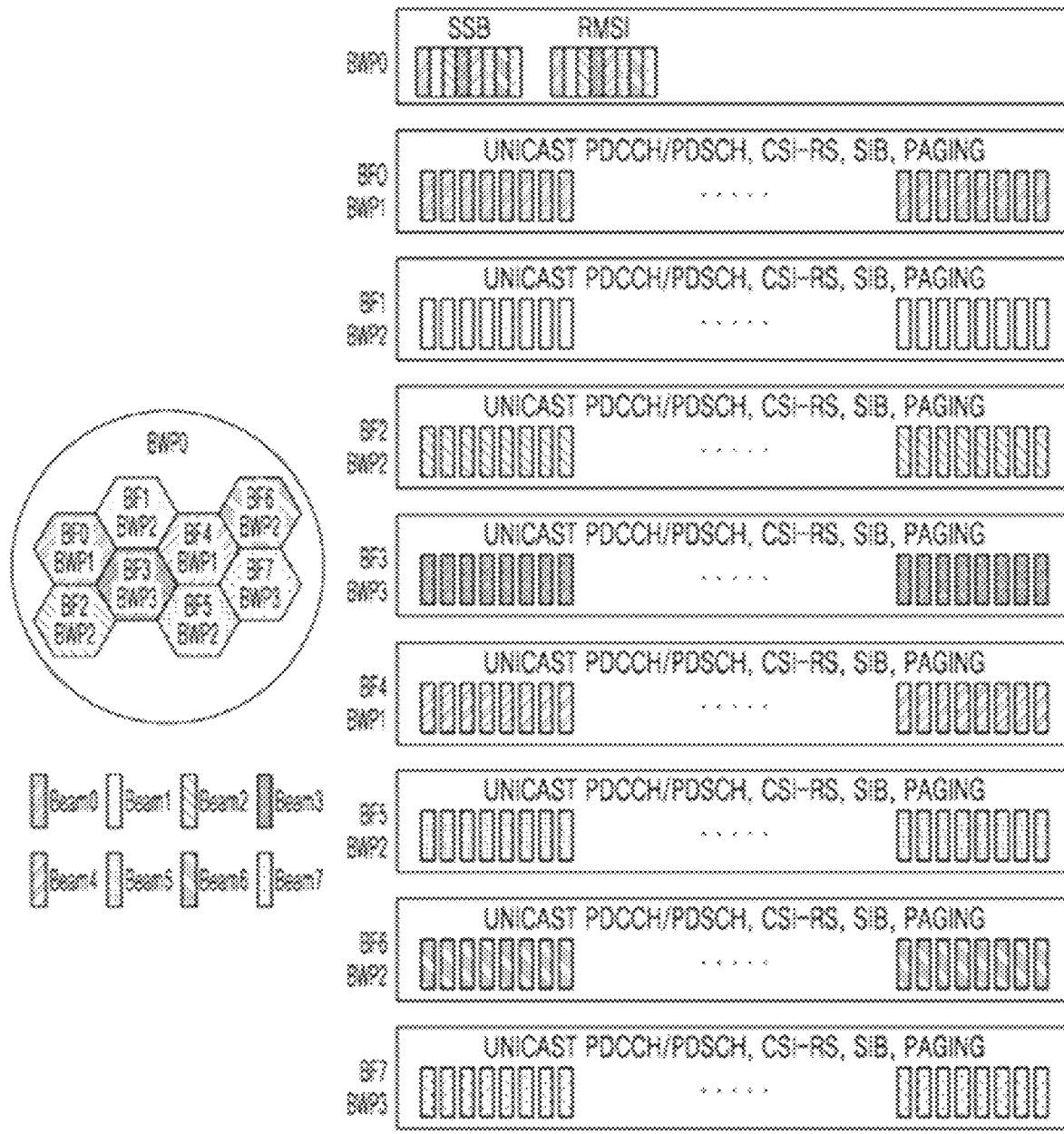
FIG. 8 illustrates a schematic diagram of a method for receiving information performed by a terminal according to an embodiment of the present disclosure.

Please refer to FIG. 8, which illustrates a schematic diagram of a method for receiving information performed by a terminal according to an embodiment of the present disclosure.

As shown in FIG. 8, the corresponding relationship between the beam footprints and the frequency bands is only reflected in the transmission of unicast PDCCH/PDSCH, CSI-RS, SIB and Paging, while the other broadcast channels/signals (such as synchronization signal blocks (SSBs), residual minimum system information (RMSI), etc.) are transmitted in turn with different beamforming on the cell common frequency band, that is, transmitted in the form of beam sweeping.

As shown in FIG. 8, FIG. 8 is basically similar to FIG. 7, except that in addition to CSI-RS and SIB being transmitted using the analog beamforming corresponding to a beam footprint, Paging information is also transmitted using the analog beamforming corresponding to a beam footprint, that is, the terminal can receive Paging information on the frequency band used for unicast PDCCH/PDSCH transmission (shown as BWP as an example in the figure) without switching to other frequency bands to receive the Paging information. For example, the terminal within the coverage range of BF0 receives the Paging on BWP1 without switching to BWP0 to receive the Paging information.

Figure 9:
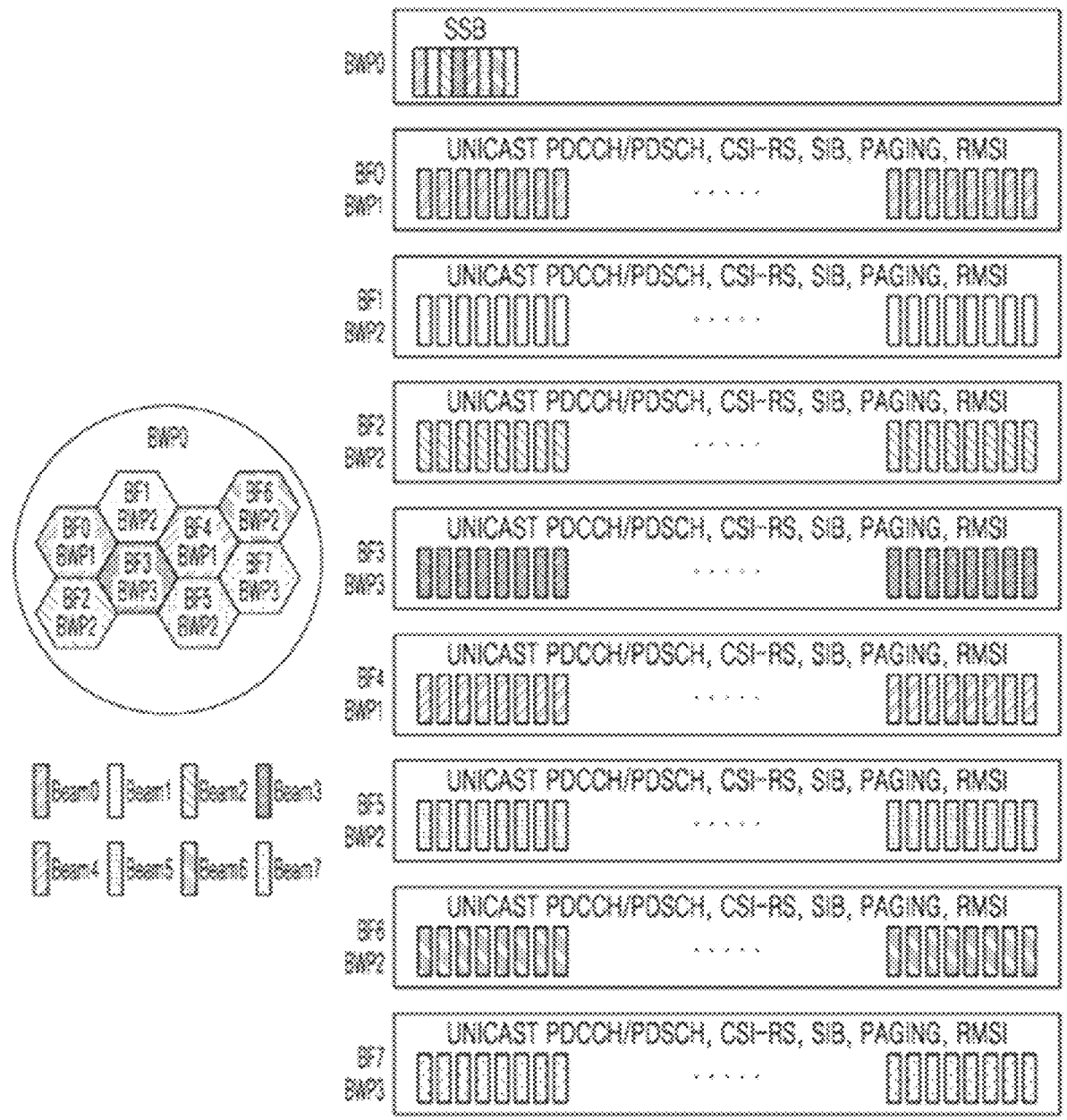
FIG. 9 illustrates a schematic diagram of a method for receiving information performed by a terminal according to an embodiment of the present disclosure.

Please refer to FIG. 9, which illustrates a schematic diagram of a method for receiving information performed by a terminal according to an embodiment of the present disclosure.

As shown in FIG. 9, the corresponding relationship between the beam footprints and the frequency bands is only reflected in the transmission of unicast PDCCH/PDSCH, CSI-RS, SIB, Paging and residual minimum system information (RMSI), while the other broadcast channels/signals (such as synchronization signal blocks (SSBs), etc.) are transmitted in turn with different beamforming on the cell common frequency band, that is, transmitted in the form of beam sweeping.

As shown in FIG. 9, FIG. 9 is similar to FIG. 8, except that in addition to CSI-RS, SIB, Paging information is transmitted by using the analog beamforming corresponding to a beam footprint, RMSI is also transmitted by using the analog beamforming corresponding to a beam footprint, that is, the terminal can receive RMSI on the frequency band used for unicast PDCCH/PDSCH transmission (shown as BWP as an example in the figure) without switching to other frequency bands to receive the RMSI, for example, the terminal within the coverage range of BF0 receives RMSI on BWP1 without switching to BWP0 to receive RMSI.

Figure 10:
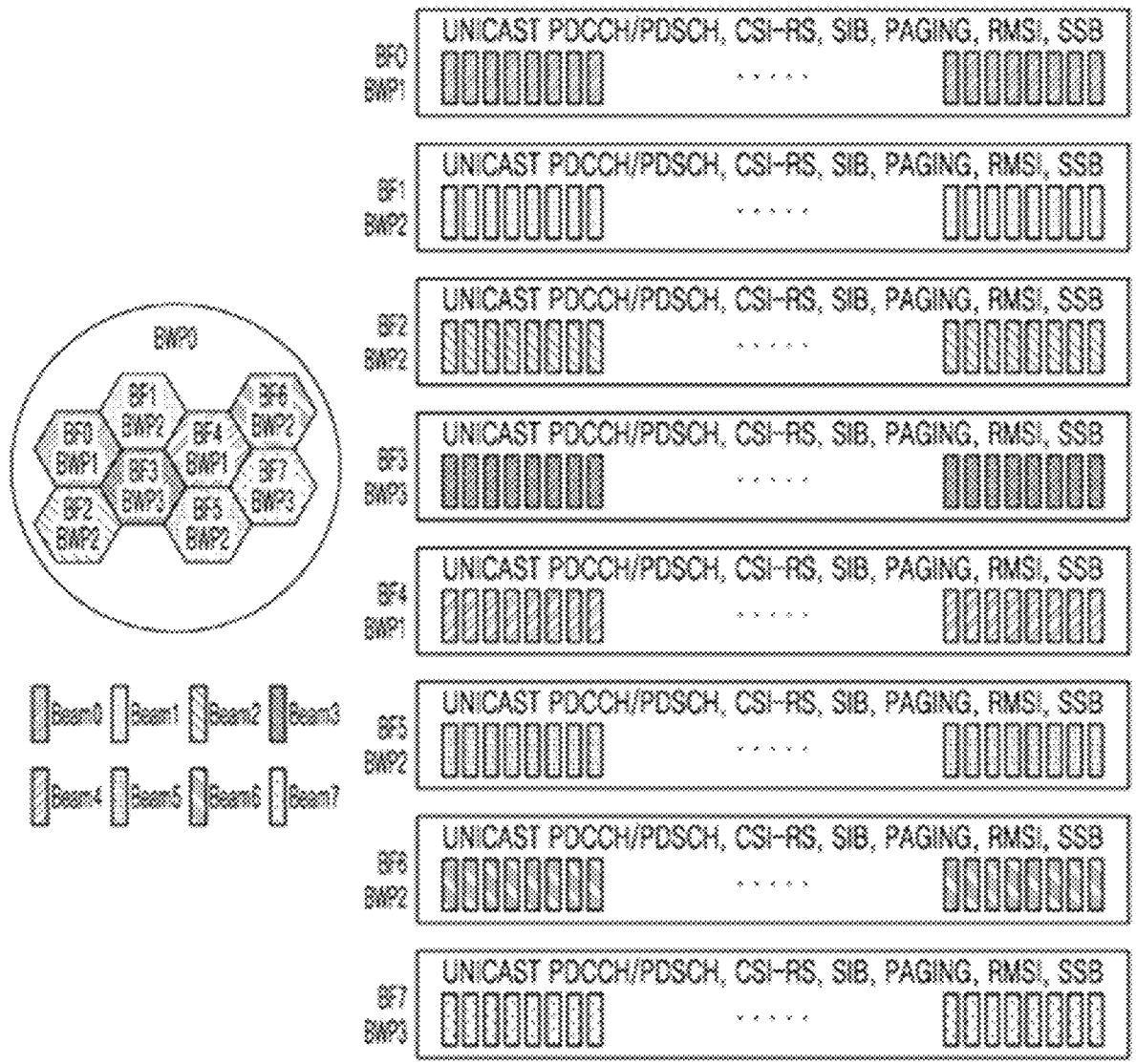
FIG. 10 illustrates a schematic diagram of a method for receiving information performed by a terminal according to an embodiment of the present disclosure.

Please refer to FIG. 10, which illustrates a schematic diagram of a method for receiving information performed by a terminal according to an embodiment of the present disclosure.

As shown in FIG. 10, the corresponding relationship between beam footprints and frequency bands is reflected in the transmission of unicast PDCCH/PDSCH, CSI-RS and all broadcast channels/signals (such as synchronization signal blocks (SSBs), residual minimum system information (RMSI), other system information blocks (SIBs), or Paging information, etc.).

As shown in FIG. 10, FIG. 10 is similar to FIG. 9, except that the system does not support BWP0 with whole cell coverage, and all transmissions are transmitted by using the analog beamforming corresponding to a beam footprint, that is, the terminal receives unicast PDCCH/PDSCH, CSI-RS, SIB, Paging, RMSI, SSB, etc. transmitted with corresponding analog beamforming on the frequency band of the serving beam footprint.

According to the method for receiving information provided by the embodiment of the disclosure, the reception of broadcast channels/signals and/or reference signals for beam footprint handover measurement is more flexible, and the homo-interference between adjacent beam footprints can be avoided.

Next, a method for transmitting information performed by a base station in an embodiment of the present disclosure will be described, and the method may include:

transmitting broadcast channels/signals and/or reference signals for beam footprint handover measurement with respective corresponding beamforming on a frequency band associated with each beam footprint in a cell; and/or, transmitting the broadcast channels/signals and/or the reference signals for the beam footprint handover measurement in turn with beam sweeping on a cell common frequency band.

As an embodiment, the method for transmitting information may further include the following steps: broadcasting a signaling to a terminal by the base station, wherein the signaling includes frequency band information associated with each beam footprint; or transmitting a UE specific signaling to the terminal, wherein the UE specific signaling includes frequency band information associated with the serving beam footprint and/or frequency band information associated with the adjacent beam footprint.

As an implementation, the frequency band information may include at least one of the following information: frequency band location information; frequency band bandwidth information; subcarrier spacing information; cyclic prefix type information; configuration information of downlink common transmission in frequency band, for example, related configuration information of broadcast PDCCH/PDSCH transmission such as SIB, RAR, Paging, etc.; configuration information of downlink dedicated transmission in frequency band, such as related configuration information of unicast PDCCH/PDSCH.

As an implementation, the broadcast channels/signals include synchronization signal blocks (SSBs), remaining minimum system information (RMSI), other system information blocks (SIBs), or paging information; the reference signals for the beam footprint handover measurement include channel state information reference signals (CSI-RSs).

It can be understood that this method for transmitting information is a method on the base station side corresponding to the above method for transmitting information performed by the terminal, and for its specific implementation details, one can refer to the corresponding description in the above method for transmitting information performed by the terminal, and it will not be repeated here.

According to the method for transmitting information provided by the embodiment of the disclosure, the reception of broadcast channels/signals and/or reference signals for beam footprint handover measurement is more flexible, and the homo-interference between adjacent beam footprints can be avoided.

The following continues to introduce a method for beam footprint handover performed by a terminal in an embodiment of the present disclosure.

Figure 11:
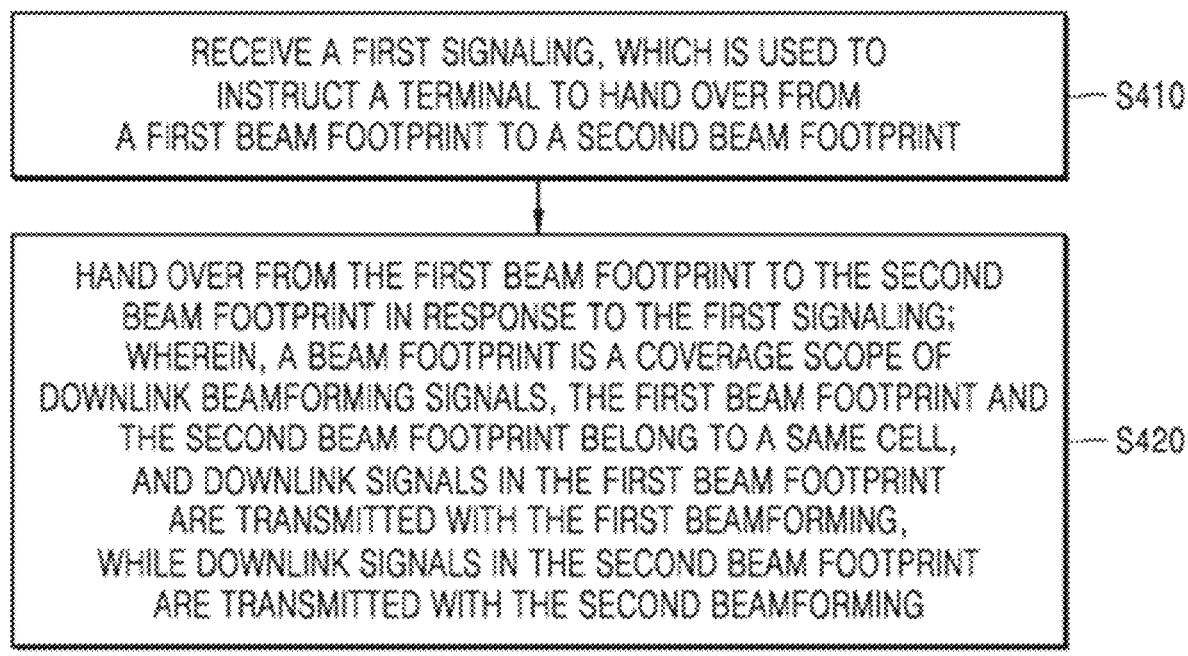
FIG. 11 illustrates a schematic diagram of a method for beam footprint handover performed by a terminal according to an embodiment of the present disclosure.

Please refer to FIG. 11. FIG. 11 illustrates a flowchart of a method for beam footprint handover performed by a terminal according to an embodiment of the present disclosure, the method can include steps S410 and S420.

In step S410, a first signaling is received, herein, the first signaling is used to instruct the terminal to hand over from a first beam footprint to a second beam footprint.

As mentioned above, the handover of a beam footprint means the switching of a corresponding frequency band. Therefore, indicating the switching of an active frequency band can implicitly indicate the handover of the corresponding beam footprint, without dedicated signaling to indicate the handover of the beam footprint. The specific implementation can be as below.

Optionally, the base station may implicitly indicate the handover of a beam footprint by indicating the switching of an active frequency band through DCI, and may reuse the active frequency band switching indication field contained in DCI for scheduling PDSCH or PUSCH in the existing NR system, that is, the downlink active BWP is indicated by DCI scheduling PDSCH, the uplink active frequency band is indicated by DCI for scheduling PUSCH, and the active frequency bands can be switched among 4 frequency bands by 2 bits at most. Correspondingly, the serving beam footprint can be switched among 4 beam footprints by 2 bits at most.

Optionally, the base station can implicitly indicate the handover of a beam footprint by indicating the switching of an active frequency band through DCI, and can enhance the existing DCI field indicating the switching of the active frequency band, for example, increase the number of bits in the existing DCI field and use more bits to support the switching of the active frequency band in more frequency bands. Because the relative moving speed between the base station and the ground terminal is fast, and the terminal may occur beam footprint handover in a short time. A lot of beam footprint handover may occur in a period of time. In order to avoid frequent reconfiguration of frequency band information, the maximum number of frequency bands available for switching can exceed the existing maximum number of 4, and even dynamic switching within all frequency bands associated with beam footprints in the cell can be supported.

Optionally, the base station may implicitly indicate the handover of the beam footprint by indicating the switching of the active frequency band through DCI, and may use dedicated DCI to indicate the switching of the active frequency band instead of indicating the switching of the active frequency band in DCI for scheduling PDSCH or PUSCH.

This has an advantage that the base station can indicate the switching of the active frequency band even if there is no data transmission. The dedicated DCI may include an indication field indicating the uplink active frequency band and/or an indication field indicating the downlink active frequency band, that is, the dedicated DCI may simultaneously indicate the switching of the uplink active frequency band and the downlink active frequency band, or only indicate the switching of the uplink active frequency band, or only indicate the downlink active frequency band.

Optionally, the base station may implicitly indicate the handover of a beam footprint by indicating the switching of the active frequency band through MAC CE, which may indicate the index of an active frequency band and/or the index of a beam. The system may define one MAC CE containing both the indication of the downlink active frequency band and the indication of the uplink active frequency band, or define two MAC CEs for the indication of switching of the downlink active frequency band and indication of switching of the uplink active frequency band, respectively.

Optionally, in the above method for indicating active frequency band switching, the switching of downlink active frequency band may imply the switching of the corresponding uplink active frequency band, or the switching of uplink active frequency band may imply the switching of corresponding downlink active frequency band, regardless of FDD system or TDD system. Each configured downlink frequency band has a corresponding uplink frequency band, for example, the system may have the corresponding relationship between downlink frequency bands and uplink frequency bands with the same frequency band index configuration by default. When the downlink active frequency band is switched, the corresponding uplink active frequency band should also be switched, that is, the signaling indicating the switching of downlink active frequency bands also implicitly indicates the switching of uplink active frequency band.

In the above method of implicitly indicating the handover of the corresponding beam footprint by indicating the switching of the active frequency band, the frequency band associated with the beam footprint can reuse the BWP configuration of the existing NR system, that is, configure multiple BWPs through UE specific RRC signaling, and then indicate the switching of the active BWP in multiple preconfigured BWPs through DCI or MAC CE, and implicitly indicate the handover of the serving beam footprint.

In addition to the above-mentioned method of implicitly indicating the handover of the corresponding beam footprint by indicating the switching of the active frequency band, the system can also introduce signaling dedicated for indicating the handover of the serving beam footprint, and implicitly indicate the switching of the corresponding transmission frequency band by indicating the handover of the serving beam footprint. For example, the base station can configure the frequency band information of all beam footprints in the cell through broadcast signaling, or configure the frequency band information of the serving beam footprint and multiple adjacent beam footprints through UE specific RRC signaling, and then indicate the handover of the serving beam footprint in multiple preconfigured beam footprints through DCI or MAC CE, and implicitly indicate the switching of the corresponding transmission frequency band.

In Step S420, the terminal hands over from the first beam footprint to the second beam footprint in response to the first signaling.

Herein, a beam footprint is the coverage range of downlink beamforming signals. The first beam footprint and the second beam footprint belong to a same cell, and downlink signals in the first beam footprint are transmitted with the first beam, while downlink signals in the second beam footprint are transmitted with the second beam.

As an implementation, the method for beam footprint handover may further include other steps.

Figure 12:
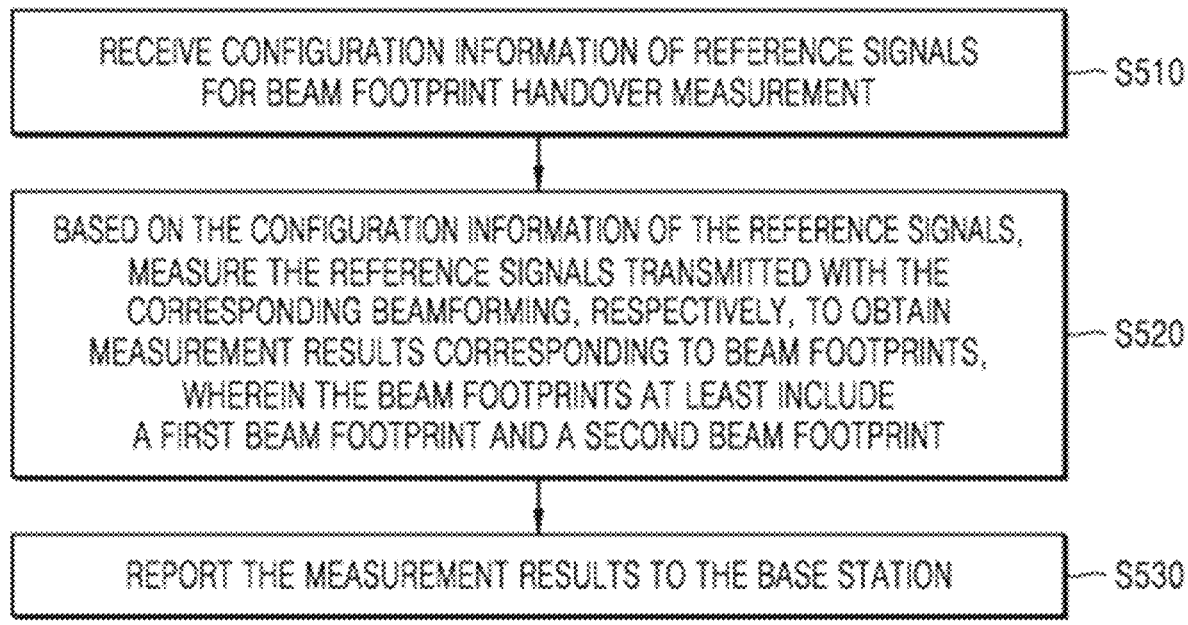
FIG. 12 illustrates a part of a schematic diagram of a method for beam footprint handover performed by a terminal according to an embodiment of the present disclosure.

Please refer to FIG. 12, which illustrates a part of a schematic diagram of a method for beam footprint handover performed by a terminal according to an embodiment of the present disclosure. The method for beam footprint handover may further include steps S510 to S530.

In Step S510, configuration information of reference signals for beam footprint handover measurement is received.

As an embodiment, the reference signals include channel state information reference signals (CSI-RSs) and/or synchronization signal blocks (SSBs).

In Step S520, based on the configuration information of the reference signals, the reference signals transmitted with corresponding beamforming is measured respectively to obtain measurement results corresponding to beam footprints, wherein the beam footprints at least include the first beam footprint and the second beam footprint.

Figure 13:
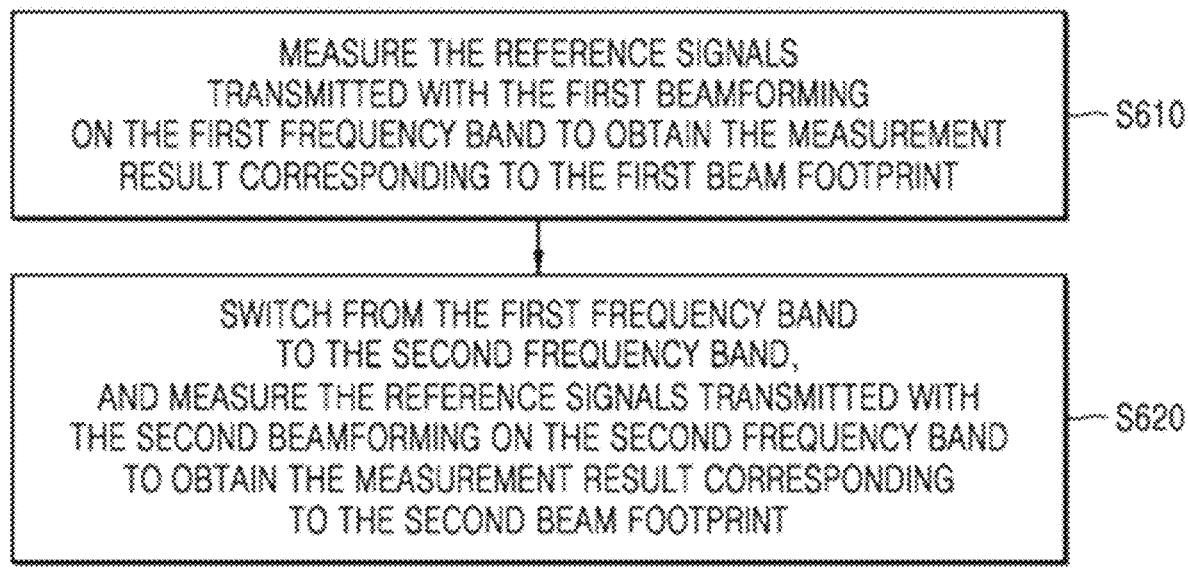
FIG. 13 illustrates a part of a schematic diagram of step 520 in the method for beam footprint handover performed by a terminal according to an embodiment of the present disclosure.

As an implementation, the reference signals for beam footprint handover measurement are transmitted with corresponding beam on the frequency band associated with each beam footprint. Please refer to FIG. 13, which illustrates a part of the flow chart of step S520, which may include step S610 and step S620.

In step S610, the terminal measures the reference signals transmitted with the first beam on the first band to obtain the measurement result corresponding to the first beam footprint.

In step S620, the terminal switches from the first frequency band to the second frequency band, and measures the reference signals transmitted with the second beam on the second frequency band to obtain the measurement result corresponding to the second beam footprint.

As another implementation, the reference signals for beam footprint handover measurement are transmitted in turn with beam sweeping on the cell common frequency band. Please refer to FIG. 14, which illustrates another part of the flow chart of step S520, which may include step S710.

In step S710, the terminal switches from the first frequency band to the cell common frequency band, measures the reference signals transmitted with the first beam to obtain the measurement result corresponding to the first beam footprint, and measures the reference signals transmitted with the second beam to obtain the measurement result corresponding to the second beam footprint on the cell common frequency band.

The measurement of reference signals for beam footprint handover measurement will be described in detail with reference to FIGS. 5 to 10.

If the reference signals for beam footprint handover measurement are CSI-RSs, and the configuration of CSI-RSs for beam footprint handover measurement is as shown in FIG. 5 above, the base station transmits CSI-RSs on BWP0 in the form of beam sweeping. In the configuration signaling of CSI-RS resources, the base station may indicate a transmission configuration indicator (TCI) state ID associated with each configured CSI-RS resource, herein, the TCI state ID is an ID of an analog beam used for transmission, and may also be called a beam ID; or, the base station does not need to indicate the associated TCI state ID for CSI-RS resources, the associated TCI state ID for CSI-RS resources is the same as or related to the index number of CSI-RS resources by default, or the associated TCI state ID is related to the time sequence of CSI-RS resources in the resource group, for example, the TCI state ID associated with the first CSI-RS resource in time is #0, and the TCI state ID associated with the second CSI-RS resource in time is #1, and so on.

In addition, the difference from the existing NR system is that there is no CSI-RS resource configuration on the active frequency band (i.e., the frequency band corresponding to the serving beam footprint, which is shown as BWP1 in FIG. 5 as an example) of the UE, but there is CSI-RS resource configuration only on the initial frequency band (which can also be called the common frequency band, such as BWP0 in FIG. 5), so when the UE performs CSI-RS measurement, it needs to switch from the active frequency band to the initial frequency band. CSI-RS measurements at least include CSI-RS measurements associated with the beam ID of the serving beam footprint and CSI-RS measurements associated with the beam IDs of the adjacent beam footprints, and the UE switches back to the active frequency band after completing the CSI-RS measurements.

As shown in FIG. 5, assuming the serving BF of the UE is BF0. In order to support beam footprint handover, the UE switches from BWP1 (BWP corresponding to BF0) to BWP0 (called common BWP or initial BWP) to perform CSI-RS measurement, and measures CSI-RS corresponding to beam 0 and CSI-RS corresponding to at least one adjacent BF (such as beam 1). If the CSI-RS measurement result corresponding to beam 1 is better than the CSI-RS measurement result corresponding to beam 0, the base station can instruct the UE to hand over its serving beam footprint from BF0 to BF1, that is, signal transmission is switched from beam 0 to beam 1, and at the same time, the transmission frequency band is switched from BWP1 to BWP2.

Optionally, CSI-RS configuration for beam footprint handover measurement is as shown in the above-mentioned FIGS. 6 to 10. The base station configures CSI-RS resources on the BWP of each beam footprint, and the CSI-RS resources are only associated with the beam IDs of the beam footprints, that is, only the CSI-RS associated with the corresponding beam ID is transmitted on each BWP. Then the base station does not need to indicate the associated TCI state ID for the configured CSI-RS resources, that is, the TCI state ID associated with the CSI-RS resources is the TCI state ID associated with the BWP, that is, the Beam ID of the located beam footprint, by default.

In addition, different from the existing NR system, UE can measure CSI-RS of corresponding beam on the active frequency band (e.g., active BWP). When measuring CSI-RSs on other beams, UE needs to switch from the active frequency band (e.g., active BWP) to other frequency bands (e.g., BWPs of adjacent beam footprints) to perform CSI-RS measurement, and return to the active frequency band (e.g., active BWP) after the completion of the CSI-RS measurement. When the same frequency band is used in multiple beam footprints, the base station can configure multiple CSI-RS resources on this frequency band, and these CSI-RS resources can be associated with different TCI state IDs.

As shown in FIG. 6, assuming the serving beam footprint (BF) of the UE is BF0. In order to support beam footprint handover, the UE measures CSI-RS corresponding to beam 0 on BWP1 (BWP corresponding to BF0), and switches from BWP1 to BWP2 (BWP corresponding to BF1) to measure CSI-RS corresponding to beam 1. If the CSI-RS measurement result corresponding to beam 1 is better than the CSI-RS measurement result corresponding to beam 0, the base station can instruct the UE to hand over its serving beam footprint from BF0 to BF1, that is, the signal transmission is switched from beam 0 to beam 1, and the transmission frequency band is switched from BWP1 to BWP2.

Optionally, if the reference signals for beam footprint handover measurement is SSB, and the SSB configuration for beam footprint handover measurement is as shown in the above-mentioned FIGS. 5 to 9, and SSB is transmitted on BWP0 in the form of beam sweeping, the UE needs to switch from the active frequency band (i.e., the frequency band corresponding to the serving beam footprint, e.g., the active BWP) to the initial frequency band (which can also be called the common frequency band, e.g., the common BWP, such as BWP0 in FIG. 5) to measure SSB, and return to the active frequency band after the completion of SSB measurement.

Optionally, the SSB configuration for beam footprint handover measurement is as shown in the above-mentioned FIG. 10. SSBs are transmitted with corresponding beamforming on each BWP, and UE can only measure SSBs of corresponding beams on active frequency bands (e.g., active BWP). If SSBs of other beams are to be measured, UE needs to switch from the active frequency band (e.g., active BWP) to other frequency bands.

In the CSI-RS measurement and/or SSB measurement for beam footprint handover described above, the terminal needs to perform the switching of frequency band, for example, either switching from the active frequency band (e.g., active BWP) to the initial frequency band (e.g., common BWP) (corresponding to FIGS. 5 to 9) or switching from the active frequency band (e.g., active BWP) to BWPs of adjacent beam footprints (BFs) (corresponding to FIG. 10) for measurement, such that the terminal cannot receive the data signals transmitted on the active frequency band (for example, the active BWP). So the base station can configure a measurement gap for beam footprint handover for the terminal, and the terminal can switch to other frequency bands within the preconfigured measurement gap to measure CSI-RS and/or SSB, and the base station will not transmit data signals to this terminal within the pre-configured measurement gap.

Figure 15:
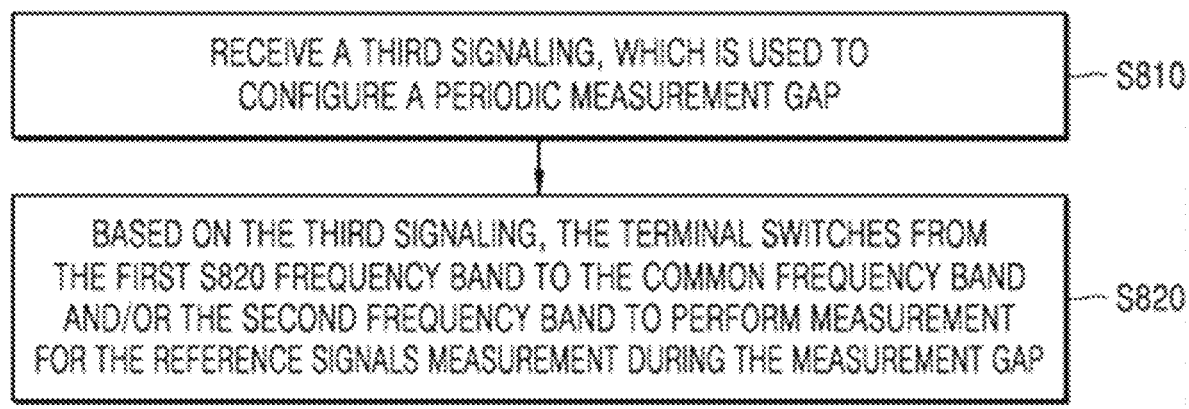
FIG. 15 illustrates a part of a schematic diagram of a method for beam footprint handover performed by a terminal according to an embodiment of the present disclosure.

Specifically, please refer to FIG. 15, which illustrates a part of a schematic diagram of a method for beam footprint handover performed by a terminal according to an embodiment of the present disclosure. The method for beam footprint handover may further include steps S810 to S820.

In step S810, the terminal receives a third signaling, which is used to configure a periodic measurement gap.

Herein, the third signaling is indicated by a medium access control (MAC) control element (CE) and/or a radio resource control (RRC) message.

In step S820, based on the third signaling, the terminal switches from the first frequency band to the common frequency band and/or the second frequency band to perform measurement for the reference signals during the measurement gap.

Please continue to reference to FIG. 11, the method for beam footprint handover further includes step S530, in which the measurement result is reported to the base station.

As an implementation, the measurement results for the reference signals include at least one of the following: physical layer reference signal received energy (RSRP); physical layer reference signal reception quality (RSRQ); physical layer signal to interference and noise ratio (SINR); average RSRP over a period of time; average RSRQ over a period of time; average SINR over a period of time; RSRP after layer 3 filtering process; RSRQ after layer 3 filtering process; SINR after layer 3 filtering process.

As an implementation, the layer 3 filtering process can be the layer 3 filtering process of the existing system, that is, the exponentially weighted moving average process; or, it can be simplified layer 3 filter process, for example, the interval setting of existing layer 3 filter parameters can be simplified or adjusted, so that the complexity of layer 3 filter process is more simplified, or the required processing time is shorter, for example, the interval time for measurement samples to be reported from layer 1 to layer 3 is shortened, and the existing 200 ms is shortened to 100 ms or even shorter.

As an implementation, the terminal can report the measurement results to the base station through PUCCH or MAC CE.

As an implementation, the terminal reports the measurement result to the base station based on an event trigger.

For example, the event may include at least one of the following:

(1) The measurement result corresponding to the second beam footprint is higher than the measurement result corresponding to the first beam footprint. For example, when the measurement value of the terminal on the beam of an adjacent beam footprint is higher than the measurement value on the beam of the serving beam footprint, the terminal can trigger the reporting of the measurement result.

(2) The measurement result corresponding to the second beam footprint is higher than the measurement result corresponding to the first beam footprint, and a difference value between them is higher than a first preconfigured threshold value. For example, when the measurement value of the terminal on the beam of the adjacent beam footprint is higher than the measurement value on the beam of the serving beam footprint, and the difference value between them is higher than the preconfigured first preconfigured threshold value, the terminal can trigger the reporting of the measurement result.

(3) The measurement result corresponding to the second beam footprint is higher than a second preconfigured threshold, and the measurement result corresponding to the first beam footprint is lower than a third preconfigured threshold. For example, when the measurement value of the terminal on the beam of the serving beam footprint is lower than the second preconfigured threshold and the measurement value on the beam of the adjacent beam footprint is higher than the third preconfigured threshold, the terminal can trigger the reporting of the measurement result.

It can be understood that the sizes of the first preconfigured threshold value, the second preconfigured threshold value and the third preconfigured threshold value can be set as required.

The aspects of measurement configuration/triggering for beam footprint handover of embodiments of the present disclosure will be described in detail below.

As an implementation, the method for beam footprint handover may further include other steps.

Figure 16:
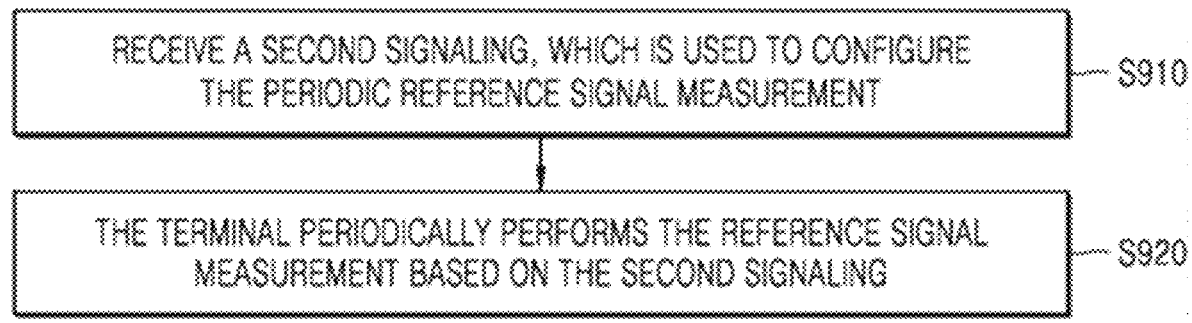
FIG. 16 illustrates a part of a schematic diagram of a method for beam footprint handover performed by a terminal according to an embodiment of the present disclosure.

Please refer to FIG. 16, which illustrates a part of a schematic diagram of a method for beam footprint handover performed by a terminal according to an embodiment of the present disclosure. The method for beam footprint handover may further include steps S910 to S920.

In step S910, the terminal receives a second signaling, which is used to configure the periodic reference signal measurement.

Herein, the second signaling is indicated by medium access control (MAC) control element (CE) and/or radio resource control (RRC) message.

In step S920, the terminal periodically performs the reference signal measurement based on the second signaling.

Optionally, the base station configures periodic CSI-RS measurement and/or SSB measurement for beam footprint handover through higher-layer signaling, that is, the terminal periodically measures CSI-RS and/or SSB for beam footprint handover, and the UE periodically measures the reference signals transmitted with the beamforming of adjacent beam footprints, in addition to measuring the reference signals transmitted with the beamforming of the serving beam footprint. The measurement configuration for the reference signals transmitted with the beamforming of the serving beam footprint and the measurement configuration for the reference signals transmitted with the beamforming of the adjacent beam footprints can share the same measurement configuration, for example, with the same measurement period, or can be configured separately, for example, with different measurement periods.

Figure 17:
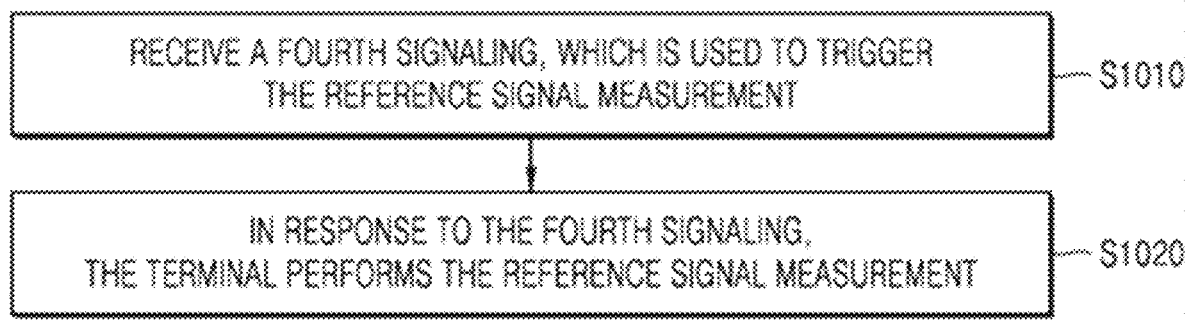
FIG. 17 illustrates a part of a schematic diagram of a method for beam footprint handover performed by a terminal according to an embodiment of the present disclosure.

Please refer to FIG. 17, which illustrates a part of a schematic diagram of a method for beam footprint handover performed by a terminal according to an embodiment of the present disclosure. The method for beam footprint handover may further include steps S1010 to S1020.

In step S1010, the terminal receives a fourth signaling, which is used to trigger the reference signal measurement.

Herein, the fourth signaling is indicated by downlink control information (DCI).

In step S1020, in response to the fourth signaling, the terminal performs the reference signal measurement.

Optionally, the base station instructs the terminal to trigger one-time reference signal measurement for beam footprint handover based on DCI or MAC-CE. For example, the base station triggers the terminal to measure SSB and/or CSI-RS corresponding to the serving beam footprint and SSB and/or CSI-RS corresponding to the adjacent beam footprints at one time. For example, the base station preconfigures multiple CSI-RS resources or resource groups through higher layer signaling, then triggers the terminal to measure a certain CSI-RS resource or resource group among them through DCI or MAC-CE. The CSI-RS resource configuration for measurement may include the ID of the frequency band where the CSI-RS resource is located or the basic configuration of BWP where the CSI-RS resource is located (such as frequency domain location and bandwidth, subcarrier spacing and CP type, etc.).

Figure 18:
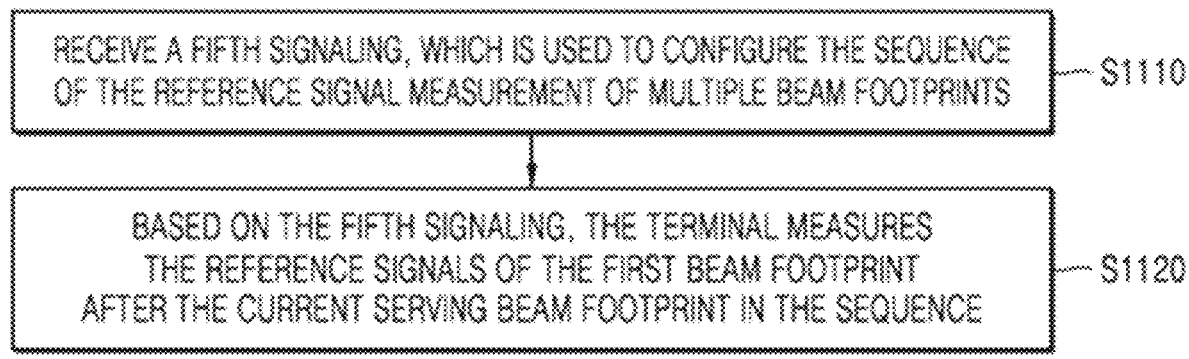
FIG. 18 illustrates a part of a schematic diagram of a method for beam footprint handover performed by a terminal according to an embodiment of the present disclosure.

Please refer to FIG. 18, which illustrates a part of a schematic diagram of a method for beam footprint handover performed by a terminal according to an embodiment of the present disclosure. The method for beam footprint handover may further include steps S1110 to S1120.

In step S1110, the terminal receives a fifth signaling, which is used to configure the sequence of the reference signal measurement of multiple beam footprints.

Herein, the fifth signaling is indicated by medium access control (MAC) control element (CE) and/or radio resource control (RRC) message.

In step S1120, based on the fifth signaling, the terminal measures the reference signals of a first beam footprint after a current serving beam footprint in the sequence.

Optionally, the base station configures reference signal measurement patterns corresponding to multiple beam footprints in sequence through high layer signaling. Since the relative moving speed and direction between the base station and the ground terminal are almost unchanged, the base station can predict when the terminal will suffer the serving beam footprint handover and which beam footprint to hand over to.

The above steps S1110 to S1120 will be described in detail with reference to FIG. 19.

Figure 19:
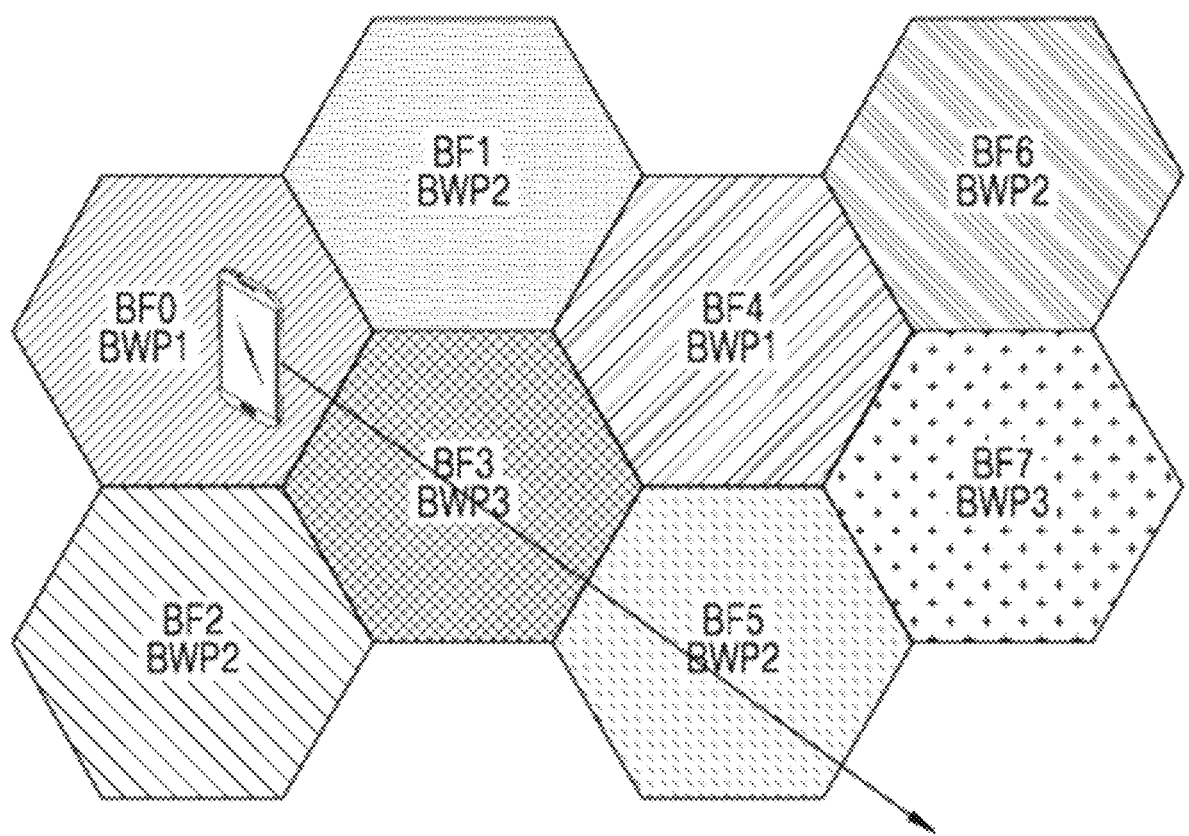
FIG. 19 illustrates a schematic diagram of configuring a sequence of reference signal measurement for multiple beam footprints according to an embodiment of the present disclosure.

Please refer to FIG. 19, which illustrates a schematic diagram of configuring a sequence of reference signal measurement for multiple beam footprints according to an embodiment of the present disclosure.

As shown in FIG. 19, the base station can predict the beam footprint handover sequence of the terminal, for example, it can predict that the terminal will hand over from beam footprint 0 (BF0) to beam footprint 3 (BF3) and then to beam footprint 5 (BF5), so the base station can configure a set of reference signal measurements for beam footprints, and the terminal can take the set of beam footprints as the reference signal measurement sequence of adjacent beam footprints. For example, the sequence can be as follows: the reference signal corresponding to BF3 is measured in BF0, and the reference signal corresponding to BF5 is measured after handing over to BF3 for a period of time. The measurement of the reference signal corresponding to each BF can be a periodic measurement within a short period of time, and the starting measurement time point of the measurement sequence can be triggered by the base station through signaling. Correspondingly, assuming that the serving beam footprint of the terminal is BF0, according to the measurement sequence preconfigured by the base station, the base station can trigger the terminal to measure the reference signal measurement of BF3 at an appropriate time for judging whether the terminal hands over from BF0 to BF3. After the terminal handed over to BF3 for a preconfigured period of time, the terminal starts the reference signal measurement of BF5 for judging whether the terminal hands over from BF3 to BF5. The triggering process of subsequent adjacent beam footprint measurement is analogized. Herein, based on the beam footprint measurement sequence configured by the base station, the terminal takes the first beam footprint after the current serving beam footprint in the sequence as the target adjacent beam footprint.

Please refer to FIG. 20, which illustrates a part of a schematic diagram of a method for beam footprint handover performed by a terminal according to an embodiment of the present disclosure. The method for beam footprint handover may further include step S1210.

In step S1210, the terminal autonomously triggers the reference signal measurement based on the predetermined or preconfigured information.

The predetermined or preconfigured information includes at least one of the following: geographic location of the terminal, satellite ephemeris, a moving direction of the terminal, moving speed of the terminal, relative moving speed between the terminal and a satellite base station, regional information of each beam footprint in a cell, regional information of adjacent beam footprints, reference signal configuration information of each beam footprint in a cell, reference signal configuration information of adjacent beam footprints, frequency band configuration information associated with each beam footprint in a cell, and frequency band configuration information associated with adjacent beam footprints.

Take that the reference signal measurement for beam footprint handover autonomously is triggered by the terminal based on its own geographic location information as an example.

For example, the base station configures the geographic location information of each beam footprint in the cell, and the CSI-RS resource configuration and/or SSB resource configuration corresponding to each beam footprint. Since the relative moving speed and direction between the terminal and the base station are almost constant, the terminal can judge whether its location is close to the adjacent beam footprint, and if so, trigger the reference signal measurement corresponding to the adjacent beam footprint.

In the above way, signaling overhead can be saved, that is, the base station does not need to trigger reference signal measurement for beam footprint handover through signaling.

Figure 21:
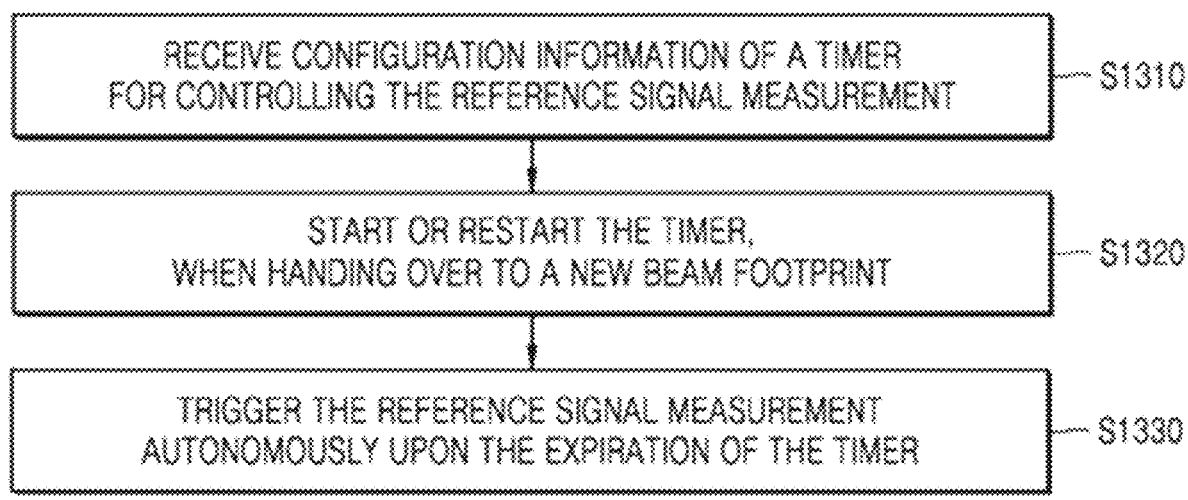
FIG. 21 illustrates a part of a schematic diagram of a method for beam footprint handover performed by a terminal according to an embodiment of the present disclosure.

Please refer to FIG. 21, which illustrates a part of a schematic diagram of a method for beam footprint handover performed by a terminal according to an embodiment of the present disclosure. The method for beam footprint handover may further include steps S1310 to S1330.

In step S1310, the terminal receives configuration information of a timer for controlling the reference signal measurement.

In step S1320, the terminal starts or restarts the timer, when handing over to a new beam footprint.

In step S1330, the terminal triggers the reference signal measurement autonomously upon the expiration of the timer.

For example, the base station configures one timer for triggering the reference signal measurement corresponding to adjacent beam footprints. The terminal starts the timer every time the terminal hands over to one new beam footprint. The terminal starts the reference signal measurement corresponding to adjacent beam footprints and can also start the reference signal measurement corresponding to the serving beam footprint, upon the expiration of the timer. The resources of the reference signals corresponding to the measured adjacent beam footprints can be preconfigured by the base station, and can be preconfigured by broadcast signaling or UE specific RRC signaling. The base station can determine the value of the timer according to the scope (e.g., diameter) of the beam footprints and the relative moving speed between the base station and the terminal, so as to ensure that the UE only initiates measurement at the junction of two beam footprints, thus saving the power consumption of the UE.

Please refer to FIG. 22, which illustrates a part of a schematic diagram of a method for beam footprint handover performed by a terminal according to an embodiment of the present disclosure. The method for beam footprint handover may further include:

In step S1410, the terminal transmits to the base station a sixth signaling, which is used to acknowledge that the first signaling transmitted by the base station was successfully received.

After transmitting the first signaling for instructing the terminal to hand over from the first beam footprint to the second beam footprint, the base station will expect the terminal to switch from the old frequency band to the new frequency band to monitor signals. If the signaling indicating the beam footprint is lost or not correctly received by the terminal, the base station and the terminal may have different understandings about the active frequency band, that is, the base station still monitors signals on the old frequency band while the base station transmits signals on a new frequency band, which will cause low transmission efficiency. To prevent this from happening, the UE may transmit a sixth signaling, such as an acknowledgment (ACK) signaling, to the base station after successfully receiving the first signaling for instructing the terminal to hand over from the first beam footprint to the second beam footprint.

Optionally, the base station indicates beam footprint handover through dedicated DCI, and the terminal feeds back ACK to the base station after successfully receiving the DCI, that is, the DCI dedicated to indicate beam footprint handover supports ACK feedback, and PUCCH resources for ACK feedback can be indicated in the DCI.

Optionally, the base station indicates beam footprint handover through MAC CE. After successfully receiving the MAC CE, the terminal transmits a MAC CE for acknowledging to the base station, that is, the MAC CE indicating beam footprint handover will have a corresponding MAC CE for acknowledgment.

Please refer to FIG. 23, which illustrates a part of a schematic diagram of a method for beam footprint handover performed by a terminal according to an embodiment of the present disclosure. The method for beam footprint handover may further include:

In step S1510, the terminal returns to the first frequency band to monitor a physical downlink control channel (PDCCH) scrambled by a cell radio network temporary identifier (C-RNTI) or a preconfigured scheduling radio network temporary identifier (CS-RNTI), if the PDCCH scrambled by the C-RNTI or the CS-RNTI is not monitored on the second frequency band within preconfigured time after the beam footprint handover is performed.

Optionally, the terminal is configured with one timer (BWP_fallback_timer), which is used to control the fallback mechanism when the beam footprint handover is unsuccessful, and can be configured by higher layer signaling. The UE switches from the first frequency band to the second frequency band and starts the BWP_fallback_timer after the terminal receives the signaling indicating the beam footprint handover. The terminal should fall back to the first frequency band if the BWP_fallback_timer expires and the PDCCH scrambled by C-RNTI or CS-RNTI has not been monitored by the terminal on the second frequency band since the handover; if the PDCCH scrambled by C-RNTI or CS-RNTI has been monitored by the terminal on the second frequency band before the BWP_fallback_timer expires, it indicates that the beam footprint handover is successful, and the terminal does not need to fall back to the first frequency band, and can continue residing on the second frequency band.

It can be understood that the frequency band associated with the beam footprint in all the above embodiments is described based on the downlink frequency band, and a similar method is also applicable to the uplink frequency band, that is, the beam footprint can also be associated with the uplink frequency band, which will not be described in detail here.

According to the method for beam footprint handover performed by the terminal provided by the embodiment of the disclosure, the same PCI is used for a plurality of adjacent beam footprints, so that the beam footprint handover can be regarded as mobility management in a cell, and the system can also control the beam footprint handover process based on layer 1 and/or layer 2 signaling, thereby reducing the overall signaling overhead, improving the time delay during beam footprint handover and avoiding the homo-interference between adjacent beam footprints.

Next, a method for beam footprint handover performed by a base station in an embodiment of the present disclosure is introduced. The method may include:

transmitting a first signaling to a terminal, wherein the first signaling is used for instructing the terminal to hand over from a first beam footprint to a second beam footprint;

Herein, a beam footprint is the coverage range of downlink beamforming signals, the first beam footprint and the second beam footprint belong to a same cell, and downlink signals in the first beam footprint are transmitted with the first beam, while downlink signals in the second beam footprint are transmitted with the second beam.

As an implementation, the first beam footprint is associated with a first frequency band and the second beam footprint is associated with a second frequency band, and handing over from the first beam footprint to the second beam footprint comprises: switching from the first frequency band to the second frequency band.

As an implementation, the first frequency band and the second frequency band do not overlap in the frequency domain.

As an implementation, the frequency band includes an uplink frequency band and/or a downlink frequency band.

As an implementation, the method for beam footprint handover further comprises: transmitting to the terminal configuration information of reference signals for beam footprint handover measurement; receiving measurement results corresponding to beam footprints reported by the terminal.

As an implementation, the method for beam footprint handover further comprises: transmitting a second signaling, wherein the second signaling is used for configuring a periodic reference signal measurement, and the second signaling is indicated through a MAC CE and/or a RRC message.

As an implementation, the method for beam footprint handover further comprises: transmitting a third signaling, wherein the third signaling is used for configuring a periodic measurement gap, and the third signaling is indicated through a MAC CE and/or a RRC message.

As an implementation, the method for beam footprint handover further comprises: transmitting a fourth signaling, wherein the fourth signaling is used for triggering the reference signal measurement, and the fourth signaling is indicated through DCI.

As an implementation, the method for beam footprint handover further comprises: transmitting a fifth signaling, wherein the fifth signaling is used for configuring a sequence of reference signal measurement of multiple beam footprints, wherein the fifth signaling is indicated through a MAC CE and/or a RRC message.

As an implementation, the method for beam footprint handover further comprises: transmitting configuration information of a timer for controlling reference signal measurement.

As an implementation, the measurement results for the reference signals include at least one of the following: physical layer reference signal received energy (RSRP); physical layer reference signal reception quality (RSRQ); physical layer signal to interference and noise ratio (SINR); average RSRP over a period of time; average RSRQ over a period of time; average SINR over a period of time; RSRP after layer 3 filtering process; RSRQ after layer 3 filtering process; SINR after layer 3 filtering process.

As an implementation, the method for beam footprint handover further comprises: receiving a sixth signaling transmitted by the terminal, wherein the sixth signaling is used for acknowledging that the first signaling transmitted by the base station is successfully received.

As an implementation, the reference signals include channel state information reference signals (CSI-RSs) and/or a synchronization signal blocks (SSBs).

It can be understood that this method for beam footprint handover is a method on the base station side corresponding to the above-mentioned method for beam footprint handover performed by the terminal, and for the specific implementation details, one can refer to the corresponding description in the above-mentioned method for beam footprint handover performed by the terminal, and it will not be repeated here.

According to the method for beam footprint handover performed by the base station provided by the embodiment of the disclosure, the same PCI is used for a plurality of adjacent beam footprints, so that the beam footprint handover can be regarded as mobility management in a cell, and the system can also control the beam footprint handover process based on layer 1 and/or layer 2 signaling, thereby reducing the overall signaling overhead, improving the time delay during beam footprint handover and avoiding the homo-interference between adjacent beam footprints.

Figure 24:
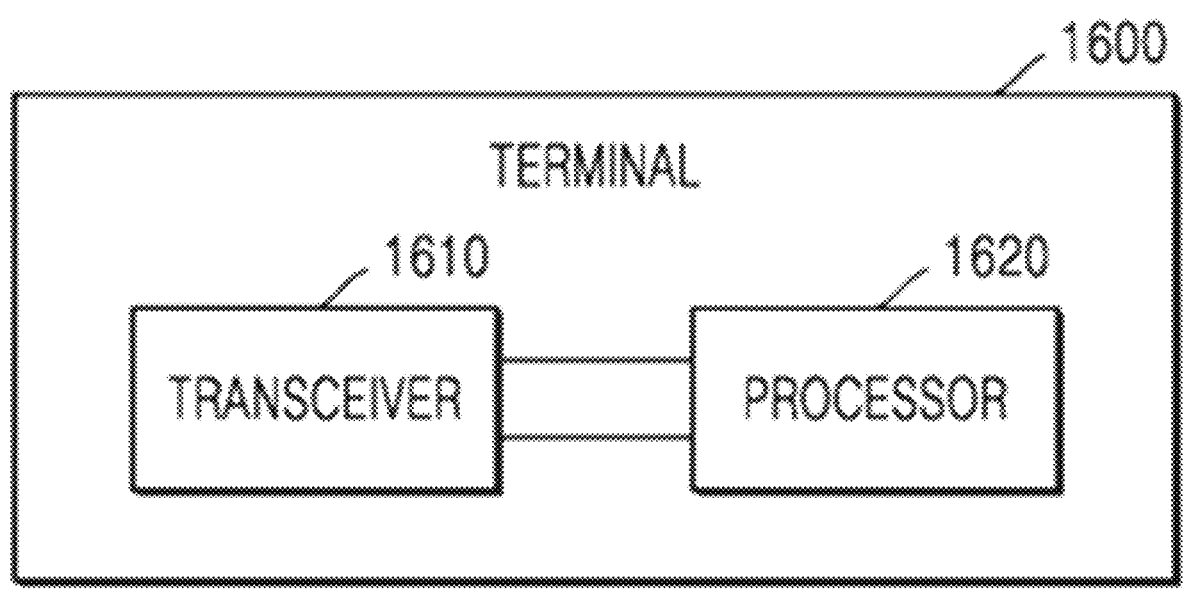
FIG. 24 is a block diagram illustrating the structure of a terminal according to an embodiment of the present disclosure.

FIG. 24 is a block diagram showing the structure of a terminal 1600 according to an embodiment of the present disclosure.

Referring to FIG. 24, the terminal 1600 includes a transceiver 1610 and a processor 1620. The transceiver 1610 is configured to transmit and receive signals to and from the outside. The processor 1620 is configured to perform the above method for beam footprint handover and the method for receiving information. The terminal 1600 can be implemented in the form of hardware, software or a combination of hardware and software, so that it can perform the method for beam footprint handover and the method for receiving information described in the present disclosure.

Figure 25:
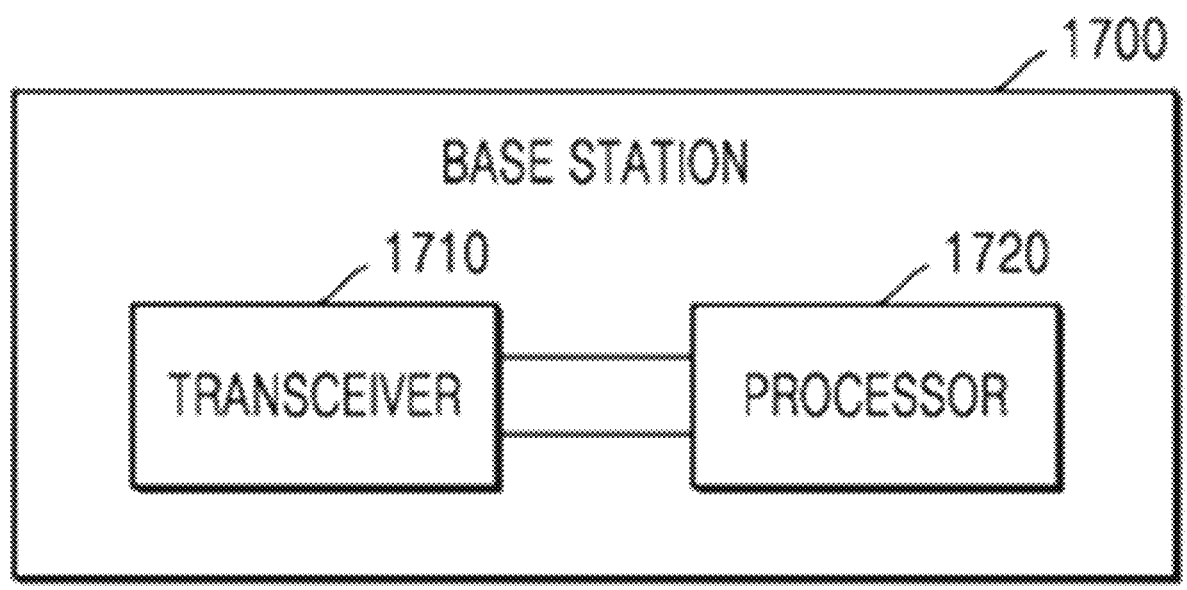
FIG. 25 is a block diagram showing the structure of a base station according to an embodiment of the present disclosure.

FIG. 25 is a block diagram showing the structure of a base station 1700 according to an embodiment of the present disclosure.

Referring to FIG. 25, a base station 1700 includes a transceiver 1710 and a processor 1720. The transceiver 1710 is configured to transmit and receive signals to and from the outside. The processor 1720 is configured to perform the above method for beam footprint handover and the method for transmitting information. The terminal 1700 can be implemented in the form of hardware, software or a combination of hardware and software, so that it can perform the method for beam footprint handover and the method for transmitting information described in the present disclosure.

At least one embodiment of the present disclosure also provides a non-transitory computer-readable recording medium having stored thereon a program, which when executed by a computer, performs the methods described above.

According to an aspect of the present disclosure, there is provided a method for beam footprint handover performed by a terminal, comprising: receiving a first signaling, wherein the first signaling is used for instructing the terminal to hand over from a first beam footprint to a second beam footprint; handing over from the first beam footprint to the second beam footprint in response to the first signaling; wherein a beam footprint is a coverage range of downlink beamforming signals, the first beam footprint and the second beam footprint belong to a same cell, and downlink signals in the first beam footprint are transmitted with a first beamforming, while downlink signals in the second beam footprint are transmitted with a second beamforming.

According to the method for beam footprint handover performed by a terminal provided by the present disclosure, wherein the first beam footprint is associated with a first frequency band and the second beam footprint is associated with a second frequency band, and the handing over from the first beam footprint to the second beam footprint comprises: switching from the first frequency band to the second frequency band.

According to the method for beam footprint handover performed by the terminal provided by the present disclosure, wherein the first frequency band and the second frequency band do not overlap in the frequency domain.

According to the method for beam footprint handover performed by the terminal provided by the present disclosure, the frequency band includes an uplink frequency band and/or a downlink frequency band.

According to the method for beam footprint handover performed by the terminal provided by the present disclosure, the method further comprises: receiving configuration information of reference signals for beam footprint handover measurement; based on the configuration information of the reference signals, respectively measuring the reference signals transmitted with corresponding beamforming to obtain measurement results corresponding to beam footprints, wherein the beam footprints at least include the first beam footprint and the second beam footprint; reporting the measurement results to a base station.

According to the method for beam footprint handover performed by a terminal provided by the present disclosure, wherein the respectively measuring the reference signals transmitted with the corresponding beamforming to obtain the measurement results corresponding to the beam footprints comprises: measuring the reference signals transmitted with the first beam on the first frequency band to obtain the measurement result corresponding to the first beam footprint; switching from the first frequency band to the second frequency band, and measuring the reference signals transmitted with the second beam on the second frequency band to obtain the measurement result corresponding to the second beam footprint; wherein the reference signals for the beam footprint handover measurement are transmitted with corresponding beamforming on the frequency band associated with each beam footprint.

According to the method for beam footprint handover performed by a terminal provided by the present disclosure, wherein the respectively measuring the reference signals transmitted with the corresponding beamforming to obtain the measurement results corresponding to the beam footprints comprises: switching from the first frequency band to a cell common frequency band, measuring the reference signals transmitted with the first beam to obtain the measurement result corresponding to the first beam footprint, and measuring the reference signals transmitted with the second beam to obtain the measurement result corresponding to the second beam footprint on the cell common frequency band; wherein the reference signals for the beam footprint handover measurement are transmitted in turn with beam sweeping on the cell common frequency band.

The method for beam footprint handover performed by the terminal provided according to the present disclosure further comprises: receiving a second signaling, wherein the second signaling is used for configuring a periodic reference signal measurement and the second signaling is indicated through a medium access control (MAC) control element (CE) and/or a radio resource control (RRC) message; and the terminal periodically performs the reference signal measurement based on the second signaling.

The method for beam footprint handover performed by the terminal provided according to the present disclosure further comprises: receiving a third signaling, wherein the third signaling is used for configuring a periodic measurement gap and the third signaling is indicated through a medium access control (MAC) control element (CE) and/or a radio resource control (RRC) message; and the terminal switches from the first frequency band to the common frequency band and/or the second frequency band and performs the reference signal measurement during the measurement gap based on the third signaling.

The method for beam footprint handover performed by the terminal provided according to the present disclosure further comprises: receiving a fourth signaling, wherein the fourth signaling is used for triggering the reference signal measurement and the fourth signaling is indicated through downlink control information (DCI); and the terminal performs the reference signal measurement in response to the fourth signaling.

The method for beam footprint handover performed by the terminal provided according to the present disclosure further comprises: receiving a fifth signaling, wherein the fifth signaling is used for configuring a sequence of reference signal measurement of multiple beam footprints and the fifth signaling is indicated through a medium access control (MAC) control element (CE) and/or a radio resource control (RRC) message; the terminal measures the reference signals of a first beam footprint after a current serving beam footprint in the sequence based on the fifth signaling.

The method for beam footprint handover performed by the terminal provided according to the present disclosure, further comprises: autonomously triggering the reference signal measurement based on predetermined or preconfigured information, wherein the predetermined or preconfigured information includes at least one of the following: geographic location of the terminal, satellite ephemeris, a moving direction of the terminal, moving speed of the terminal, relative moving speed between the terminal and a satellite base station, regional information of each beam footprint in a cell, regional information of adjacent beam footprints, reference signal configuration information of each beam footprint in a cell, reference signal configuration information of adjacent beam footprints, frequency band configuration information associated with each beam footprint in a cell, and frequency band configuration information associated with adjacent beam footprints.

The method for beam footprint handover performed by the terminal provided according to the present disclosure further comprises: receiving configuration information of a timer for controlling the reference signal measurement; starting or restarting the timer when handing over to a new beam footprint; autonomously triggering the reference signal measurement upon expiration of the timer.

The method for beam footprint handover performed by the terminal provided according to the present disclosure, wherein the measurement results for the reference signals include at least one of the following: physical layer reference signal received energy (RSRP); physical layer reference signal reception quality (RSRQ); physical layer signal to interference and noise ratio (SINR); average RSRP over a period of time; average RSRQ over a period of time; average SINR over a period of time; RSRP after layer 3 filtering process; RSRQ after layer 3 filtering process; SINR after layer 3 filtering process.

The method for beam footprint handover performed by the terminal provided according to the present disclosure, wherein reporting the measurement results to the base station comprises: reporting the measurement results to the base station based on an event trigger, wherein the event includes at least one of the following: the measurement result corresponding to the second beam footprint is higher than the measurement result corresponding to the first beam footprint; the measurement result corresponding to the second beam footprint is higher than the measurement result corresponding to the first beam footprint, and a difference value between them is higher than a first preconfigured threshold value; the measurement result corresponding to the second beam footprint is higher than a second preconfigured threshold, and the measurement result corresponding to the first beam footprint is lower than a third preconfigured threshold.

The method for beam footprint handover performed by the terminal provided according to the present disclosure, further comprises: transmitting a sixth signaling to the base station, wherein the sixth signaling is used for acknowledging that the first signaling transmitted by the base station is successfully received.

The method for beam footprint handover performed by the terminal provided according to the present disclosure, further comprises: returning to the first frequency band to monitor a physical downlink control channel (PDCCH) scrambled by a cell radio network temporary identifier (C-RNTI) or a preconfigured scheduling radio network temporary identifier (CS-RNTI), if the PDCCH scrambled by the C-RNTI or the CS-RNTI is not monitored on the second frequency band within preconfigured time after the beam footprint handover is performed.

The method for beam footprint handover performed by the terminal provided according to the present disclosure, wherein the reference signals include channel state information reference signals (CSI-RSs) and/or synchronization signal blocks (SSBs).

According to an aspect of the present disclosure, there is provided a method for receiving information performed by a terminal, comprising: receiving broadcast channels/signals and/or reference signals for beam footprint handover measurement according to at least one of the following ways, based on frequency band information associated with beam footprints and/or cell common frequency band information: receiving the broadcast channels/signals and/or the reference signals for the beam footprint handover measurement transmitted with corresponding beamforming on the frequency band associated with a serving beam footprint; switching from a frequency band associated with the serving beam footprint to a frequency band associated with an adjacent beam footprint to receive the reference signals for the beam footprint handover measurement transmitted with the corresponding beamforming; or switching from the frequency band associated with the serving beam footprint to the cell common frequency band to receive the broadcast channels/signals and/or the reference signals for the beam footprint handover measurement, wherein the broadcast channels/signals and/or the reference signals for the beam footprint handover measurement are transmitted in turn with beam sweeping on the cell common frequency band; wherein the serving beam footprint is a coverage range of beamforming signals currently serving the terminal, and the adjacent beam footprint is a beam footprint geographically adjacent to the serving beam footprint.

The method for receiving information performed by the terminal provided according to the present disclosure, wherein the frequency band information associated with the beam footprints is acquired according to at least one of the following methods: acquiring frequency band information associated with each beam footprint in a cell by receiving a signaling broadcast by a base station, and acquiring frequency band information associated with the serving beam footprint and/or frequency band information associated with the adjacent beam footprint from the frequency band information associated with each beam footprint; or acquiring the frequency band information associated with the serving beam footprint and/or the frequency band information associated with the adjacent beam footprint by receiving the UE specific signaling transmitted by the base station.

The method for receiving information performed by the terminal provided according to the present disclosure, wherein the frequency band information includes at least one of the following information: frequency band location information; frequency band bandwidth information; sub-carrier spacing information; cyclic prefix type information; configuration information of downlink common transmission in frequency band; configuration information of downlink dedicated transmission in frequency band.

The method for receiving information performed by the terminal provided according to the present disclosure, wherein the broadcast channels/signals include synchronization signal blocks (SSBs), remaining minimum system information (RMSI), other system information blocks (SIBs), or paging information; the reference signals for the beam footprint handover measurement include channel state information reference signals (CSI-RSs).

According to an aspect of the present disclosure, there is provided a method for beam footprint handover performed by a base station, comprising: transmitting a first signaling to a terminal, wherein the first signaling is used for instructing the terminal to hand over from a first beam footprint to a second beam footprint; wherein a beam footprint is the coverage range of downlink beamforming signals, the first beam footprint and the second beam footprint belong to a same cell, and downlink signals in the first beam footprint are transmitted with the first beam, while downlink signals in the second beam footprint are transmitted with the second beam.

The method for beam footprint handover performed by a base station provided according to the present disclosure, wherein the first beam footprint is associated with a first frequency band and the second beam footprint is associated with a second frequency band, and handing over from the first beam footprint to the second beam footprint comprises: switching from the first frequency band to the second frequency band.

The method for beam footprint handover performed by a base station provided according to the present disclosure, wherein the first frequency band and the second frequency band do not overlap in the frequency domain.

The method for beam footprint handover performed by a base station provided according to the present disclosure, wherein the frequency band includes an uplink frequency band and/or a downlink frequency band.

The method for beam footprint handover performed by a base station provided according to the present disclosure, further comprises: transmitting to the terminal configuration information of reference signals for beam footprint handover measurement; receiving measurement results corresponding to beam footprints reported by the terminal.

The method for beam footprint handover performed by a base station provided according to the present disclosure, further comprises: transmitting a second signaling, wherein the second signaling is used for configuring a periodic reference signal measurement, and the second signaling is indicated through a MAC CE and/or a RRC message.

The method for beam footprint handover performed by a base station provided according to the present disclosure, further comprises: transmitting a third signaling, wherein the third signaling is used for configuring a periodic measurement gap, and the third signaling is indicated through a MAC CE and/or a RRC message.

The method for beam footprint handover performed by a base station provided according to the present disclosure, further comprises: transmitting a fourth signaling, wherein the fourth signaling is used for triggering the reference signal measurement, and the fourth signaling is indicated through DCI.

The method for beam footprint handover performed by a base station provided according to the present disclosure, further comprises: transmitting a fifth signaling, wherein the fifth signaling is used for configuring a sequence of reference signal measurement of multiple beam footprints, wherein the fifth signaling is indicated through a MAC CE and/or a RRC message.

The method for beam footprint handover performed by a base station provided according to the present disclosure, further comprises: transmitting configuration information of a timer for controlling reference signal measurement.

The method for beam footprint handover performed by the base station provided according to the present disclosure, wherein the measurement results for the reference signals include at least one of the following: physical layer reference signal received energy (RSRP); physical layer reference signal reception quality (RSRQ); physical layer signal to interference and noise ratio (SINR); average RSRP over a period of time; average RSRQ over a period of time; average SINR over a period of time; RSRP after layer 3 filtering process; RSRQ after layer 3 filtering process; SINR after layer 3 filtering process.

The method for beam footprint handover performed by a base station provided according to the present disclosure, further comprises: receiving a sixth signaling transmitted by the terminal, wherein the sixth signaling is used for acknowledging that the first signaling transmitted by the base station is successfully received.

The method for beam footprint handover performed by the base station provided according to the present disclosure, wherein the reference signals include channel state information reference signals (CSI-RSs) and/or synchronization signal blocks (SSBs).

According to an aspect of the present disclosure, there is provided a method for transmitting information performed by a base station, comprising: transmitting broadcast channels/signals and/or reference signals for beam footprint handover measurement with respective corresponding beamforming on a frequency band associated with each beam footprint in a cell; and/or transmitting the broadcast channels/signals and/or the reference signals for the beam footprint handover measurement in turn with beam sweeping on a cell common frequency band.

The method for transmitting information performed by a base station provided according to the present disclosure, further comprises: broadcasting a signaling to a terminal by the base station, wherein the signaling includes frequency band information associated with each beam footprint; or transmitting a UE specific signaling to the terminal, wherein the UE specific signaling includes frequency band information associated with the serving beam footprint and/or frequency band information associated with the adjacent beam footprint.

The method for transmitting information performed by a base station provided according to the present disclosure, wherein the frequency band information includes at least one of the following information: frequency band location information; frequency band bandwidth information; sub-carrier spacing information; cyclic prefix type information; configuration information of downlink common transmission in frequency band; configuration information of downlink dedicated transmission in frequency band.

The method for transmitting information performed by a base station provided according to the present disclosure, wherein the broadcast channels/signals include synchronization signal blocks (SSBs), remaining minimum system information (RMSI), other system information blocks (SIBs), or paging information; the reference signals for the beam footprint handover measurement include channel state information reference signals (CSI-RSs).

According to an aspect of the present disclosure, there is provided a terminal, comprising: a transceiver configured to transmit and receive signals with the outside; and a processor configured to control the transceiver to perform the above described method for beam footprint handover and the method for receiving information.

According to an aspect of the present disclosure, there is provided a base station, comprising: a transceiver configured to transmit and receive signals with the outside; and a processor configured to control the transceiver to perform the above described method for beam footprint handover and the method for transmitting information.

In several embodiments provided in this application, it should be understood that the disclosed apparatus and method can also be implemented in other ways. The apparatus embodiments described above are merely illustrative, for example, the flowcharts and block diagrams in the drawings show the architecture, functions and operations of possible implementations of apparatuses, methods and computer program products according to various embodiments of the present disclosure. In this regard, each block in the flowchart or block diagram may represent a module, program segment or part of code including one or more executable instructions for implementing specified logical functions. It should also be noted that in some alternative implementations, the functions marked in the blocks may also occur in a different order from those marked in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

Various embodiments of the present disclosure may be implemented as computer readable code embodied on a computer readable recording medium from a specific perspective. A computer-readable recording medium can be any data storage device that can store data readable by a computer system. Examples of the computer-readable recording medium may include read-only memory (ROM), random access memory (RAM), compact disk read-only memory (CD-ROM), magnetic tape, floppy disk, optical data storage device, carrier wave (e.g., data transmission via the Internet), and the like. Computer readable recording media can be distributed by computer systems connected via a network, and thus computer readable codes can be stored and executed in a distributed manner. Furthermore, functional programs, codes, and code segments for implementing various embodiments of the present disclosure can be easily explained by those skilled in the art to which the embodiments of the present disclosure are applied.

It will be understood that embodiments of the present disclosure may be implemented in hardware, software, or a combination of hardware and software. Software may be stored as program instructions or computer readable code executable on a processor on a non-transitory computer readable medium. Examples of non-transitory computer-readable recording media include magnetic storage media (e.g., ROM, floppy disk, hard disk, etc.) and optical recording media (e.g., CD-ROM, digital video disk (DVD), etc.). Non-transient computer-readable recording media can also be distributed on computer systems coupled by networks, so that computer-readable codes can be stored and executed in a distributed manner. The medium can be read by a computer, stored in a memory, and executed by a processor. The various embodiments may be implemented by a computer or a portable terminal including a controller and a memory, and the memory may be an example of a non-transitory computer readable recording medium suitable for storing program (s) having instructions to implement the embodiments of the present disclosure. The present disclosure can be realized by a program having code for concretely implementing the apparatus and method described in the claims, which is stored in a machine (or computer) readable storage medium. The program can be electronically carried on any medium, such as a communication signal transmitted via a wired or wireless connection, and the present disclosure suitably includes equivalents thereof.

The above description is only the specific implementation of this disclosure, but the protection scope of this disclosure is not limited to this. Any person familiar with this technical field can make various changes or substitutions within the technical scope disclosed in this disclosure, and these changes or substitutions should be covered within the protection scope of this disclosure. Therefore, the protection scope of this disclosure shall be subject to the protection scope of the claims. The embodiments of the present application are merely for ease of description and assistance in comprehension of the present disclosure, and are not intended to limit the scope of the present application. Therefore, it should be understood that, except for the embodiments disclosed herein, all modifications and changes or forms of modifications and changes derived from the technical concept of the present application fall within the scope of the present application.

The invention claimed is:

1. A method for beam footprint handover performed by a terminal, the method comprising:
   receiving a first signaling instructing the terminal to hand over from a first beam footprint to a second beam footprint;
   handing over from the first beam footprint to the second beam footprint in response to the first signaling,
     wherein the first beam footprint and the second beam footprint belong to a same cell, and
     wherein the first beam footprint is associated with a first frequency band, and the second beam footprint is associated with a second frequency band; and
   returning to the first frequency band to monitor a physical downlink control channel (PDCCH) scrambled by a cell radio network temporary identifier (C-RNTI) or a preconfigured scheduling radio network temporary identifier (CS-RNTI), if the PDCCH scrambled by the C-RNTI or the CS-RNTI is not monitored on the second frequency band within preconfigured time after the beam footprint handover is performed.

2. The method of claim 1, wherein the handing over from the first beam footprint to the second beam footprint comprises switching from the first frequency band to the second frequency band.

3. The method of claim 2, wherein the first frequency band and the second frequency band do not overlap in the frequency domain.

4. The method of claim 2, wherein the first frequency band includes an uplink frequency band and/or a downlink frequency band.

5. The method of claim 1, further comprising:
receiving configuration information of reference signals for beam footprint handover measurement;
based on the configuration information of the reference signals, measuring a first reference signal among the reference signals to obtain a first measurement result corresponding to the first beam footprint;
based on the configuration information of the reference signals, measuring a second reference signal among the reference signals to obtain a second measurement result corresponding to the second beam footprint; and
reporting the first measurement result and the second measurement result to a base station,
wherein the reference signals include at least one of a channel state information reference signal (CSI-RS) and a synchronization signal block (SSB).

6. The method of claim 5, further comprising switching from the first frequency band to the second frequency band, wherein the reference signals for the beam footprint handover measurement are transmitted with corresponding beamforming on a frequency band associated with each beam footprint.

7. The method of claim 5, further comprising switching from the first frequency band to a cell common frequency band,
wherein the reference signals for the beam footprint handover measurement are transmitted in turn with beam sweeping on the cell common frequency band.

8. The method of claim 5, further comprising:
receiving a second signaling, wherein the second signaling is used for configuring a periodic reference signal measurement, and the terminal periodically performs a reference signal measurement based on the second signaling, wherein the second signaling is indicated through a medium access control (MAC) control element (CE) and/or a radio resource control (RRC) message;
receiving a third signaling, wherein the third signaling is used for configuring a periodic measurement gap, and the terminal switches from the first frequency band to a cell common frequency band and/or the second frequency band and performs the reference signal measurement during the measurement gap based on the third signaling, wherein the third signaling is indicated through the medium access control (MAC) control element (CE) and/or the radio resource control (RRC) message;
receiving a fourth signaling, wherein the fourth signaling is used for triggering the reference signal measurement, and the terminal performs the reference signal measurement in response to the fourth signaling, wherein the fourth signaling is indicated through downlink control information (DCI); or
receiving a fifth signaling, wherein the fifth signaling is used for configuring a sequence of the reference signal measurement of a plurality of beam footprints, the terminal measures the second reference signal after the first reference signal in a sequence based on the fifth signaling, wherein the fifth signaling is indicated through the medium access control (MAC) control element (CE) and/or the radio resource control (RRC) message.

9. The method of claim 5, further comprising:
triggering a reference signal measurement based on predetermined or preconfigured information,
wherein the predetermined or preconfigured information includes at least one of the following: geographic location of the terminal, satellite ephemeris, a moving direction of the terminal, moving speed of the terminal, relative moving speed between the terminal and a satellite base station, regional information of each beam footprint in a cell, regional information of adjacent beam footprints, reference signal configuration information of each beam footprint in a cell, reference signal configuration information of adjacent beam footprints, frequency band configuration information associated with each beam footprint in a cell, and frequency band configuration information associated with adjacent beam footprints.

10. The method of claim 5, further comprising:
receiving configuration information of a timer for controlling a reference signal measurement;
starting or restarting the timer when handing over to a new beam footprint; and
triggering the reference signal measurement upon expiration of the timer.

11. The method of claim 5, wherein the first measurement result and the second measurement result include at least one of the following:
information regarding physical layer reference signal received energy (RSRP);
information regarding physical layer reference signal reception quality (RSRQ);
information regarding physical layer signal to interference and noise ratio (SINR);
information regarding average RSRP over a period of time;
information regarding average RSRQ over a period of time;
information regarding average SINR over a period of time;
information regarding RSRP after layer 3 filtering process;
information regarding RSRQ after layer 3 filtering process; or
information regarding SINR after layer 3 filtering process.

12. The method of claim 5, wherein the reporting of the first measurement result and the second measurement result to the base station is based on an event trigger,
wherein the event includes at least one of the following:
the second measurement result is higher than the first measurement result;
the second measurement result is higher than the first measurement result, and a difference value between the first measurement result and the second measurement result is higher than a first preconfigured threshold value; and
the second measurement result is higher than a second preconfigured threshold, and the first measurement result is lower than a third preconfigured threshold.

13. The method of claim 1, further comprising transmitting to the base station a sixth signaling, which is used to acknowledge that the first signaling transmitted by the base station was successfully received.

14. A method for beam footprint handover performed by a base station, the method comprising:

transmitting a first signaling to a terminal, wherein the first signaling instructs the terminal to hand over from a first beam footprint to a second beam footprint, wherein the first beam footprint and the second beam footprint belong to a same cell, wherein the first beam footprint is associated with a first frequency band, and the second beam footprint is associated with a second frequency band, and wherein a physical downlink control channel (PDCCH) scrambled by a cell radio network temporary identifier (C-RNTI) or a preconfigured scheduling radio network temporary identifier (CS-RNTI) is monitored on the first frequency band, if the PDCCH scrambled by the C-RNTI or the CS-RNTI is not monitored on the second frequency band within preconfigured time after the beam footprint handover is performed.

* * * * *